United States Patent
Xiong et al.

(10) Patent No.: US 9,928,519 B2
(45) Date of Patent: Mar. 27, 2018

(54) SYSTEM AND METHOD FOR SHARING A PRIZE PROMOTION

(71) Applicants: Shiyue Xiong, Arcadia, CA (US); Dingge Xiong, Arcadia, CA (US)

(72) Inventors: Shiyue Xiong, Arcadia, CA (US); Dingge Xiong, Arcadia, CA (US)

(*) Notice: Subject to any disclaimer, the term of this patent is extended or adjusted under 35 U.S.C. 154(b) by 190 days.

(21) Appl. No.: 14/881,294

(22) Filed: Oct. 13, 2015

(65) Prior Publication Data

US 2016/0110748 A1    Apr. 21, 2016

Related U.S. Application Data

(60) Provisional application No. 62/065,751, filed on Oct. 19, 2014.

(51) Int. Cl.
   *G06Q 30/02* (2012.01)
(52) U.S. Cl.
   CPC .............................. *G06Q 30/0212* (2013.01)
(58) Field of Classification Search
   None
   See application file for complete search history.

(56) References Cited

U.S. PATENT DOCUMENTS

| | | | |
|---|---|---|---|
| 2006/0085284 A1* | 4/2006 | Cardenas | G06Q 30/02 705/26.1 |
| 2012/0303425 A1* | 11/2012 | Katzin | G06Q 20/027 705/14.4 |
| 2014/0038703 A1* | 2/2014 | Lampert | G07F 17/329 463/26 |
| 2015/0220958 A1* | 8/2015 | Tietzen | G06Q 30/0226 705/14.15 |

\* cited by examiner

*Primary Examiner* — Sunit Pandya

(57) ABSTRACT

A method implemented by computer-networks comprises the following steps: creating a mutual aid group capable of accommodating a plurality of small businesses using programming codes by assigning values to its attributes including the attribute on the shares which the prize offered by the mutual aid group is divided into; and storing the created mutual aid group in a mutual aid group storage area in a database; and recruiting at least one business into the mutual aid group by the businesses subscribing for the share of the mutual aid group for jointly running a prize promotion; and running the collective promotional campaign through the mutual aid group for all the members having joined the mutual aid group to produce winners; and controlling the running process of the mutual aid group including the process of grouping the businesses, the process of running the collective campaign, and the transformation of these processes. A system based on the computer-networks supports the implement of the above method.

6 Claims, 22 Drawing Sheets

ABC.com

My Cart    My Account    Login

| initiate | join | play | contribute | contributions |
| post-creation | creations | winners | claim | Biz Finder | contents of a page

Creation Form for Creating a Mutual Aid Group

Administrator ID:          Creation Time:          Creation No.

Attributes of the Mutual Aid Group:

| Group ID | | Type | ☐ sweepstakes<br>☐ contest | Total Shares | | |
|---|---|---|---|---|---|---|
| Cost Per Share | | Passcode | ☒ Yes  ☐ No | Ratio of Passcodes to Shares / common passcode | | |
| Duration of Campaign | | Odds of Winning | | Stage | Grouping | |
| Total Amount of Prize | | 1$^{st}$ Prize | amount  number | 2$^{nd}$ Prize | amount | number |
| 3$^{rd}$ Prize | amount  number | 4$^{th}$ Prize | | 5$^{th}$ Prize | | |

Additional Attributes:

| Prohibited Area | |
|---|---|

| Qualification | locality-restriction  select one  V | business-classification-restriction  select one  V |
|---|---|---|
| | 1) unlimited | 1) unlimited |
| | 2) only one sponsor each city | 2) only office supplies |
| | 3) only two sponsors each zip code | 3) must be different from existing members |

| Rule of Picking Winning Numbers | Select One                                V |
|---|---|
| | 1) pick 5 numbers from 1 to 20 |
| | 2) pick 4 numbers from 1 to 10 |
| | 3) pick 3 numbers from 1 to 10 |

Submit          Reset

FIG 5

| Condition of Transformation of Stage | Stage | Value of Stage Attribute |
|---|---|---|
| When an initiator initiates a self-custom mutual aid group | Initiating stage | Default value: initiating |
| When an administrator releases a mutual aid group or approves a self-custom group | Grouping stage | Default value: Grouping or be changed from "initiating" to "grouping" |
| When the "subscribed share" reaches the total share | Campaigning stage | Be changed from "grouping" to "campaigning" |
| When the preset end time of the campaign comes | Closed stage | Be changed from "campaigning" to "closed" |

FIG 7

| User Name | |
|---|---|
| Password | |

Log in

Register Form

| User Name* | | Password* | | Reenter Password* | |
|---|---|---|---|---|---|
| Information on you: | | | | | |
| Email * | | Real Age * | | Sex | |
| City * | | State * | | Zip * | |
| Information on your business: | | | | | |
| Entity name* | | | DBA, Doing Business As | | |
| EIN* | | | State ID | | |
| Classification* | | | Annual sales* | | |
| Officer's name* | | | Officer's position | | |
| Tel* | | | Email* | | |
| Street Address* | | | | | |
| City* | | | State* | | |
| zip* | | | Website | | |

1) Information with * must be provided.
2) ☒ By check this box you verify you are 18 or older if you register as a player.

Register   Reset

FIG 8

Initiation Form for Initiating a Self-Custom Mutual Aid Group

Information about initiator:      User ID:    Co-initiator:     Application No.    Time:

| Entity name* | | DBA | |
|---|---|---|---|
| EIN* | | State ID | |
| Classification* | | Officer's name* | |
| Tel* | | Email* | |
| Street Address* | | | |
| City* | | State* | |
| zip* | | Website | |

Attributes of the self-custom mutual aid group

| Group ID | | Type | | ☐ sweepstakes ☐ contest | Total Shares | |
|---|---|---|---|---|---|---|
| Cost Per Share | | Passcode | ☒ Yes ☐ No | | Ratio of Passcodes to Shares / Common passcode | |
| Duration of Campaign | | Odds of Winning | | | Stage | Initiating |
| Total Amount of Prize | | 1st Prize | amount | number | 2nd Prize | amount | number |
| 3rd Prize | amount | number | 4th Prize | | 5th Prize | |

Additional Attributes:

| Prohibited Area | |
|---|---|

| Qualification | locality-restriction  select one ▽ | business-classification-restriction  select one ▽ |
|---|---|---|
| | 1) unlimited | 1) unlimited |
| | 2) only one sponsor each city | 2) only office supplies |
| | 3) only two sponsors each zip code | 3) must be different from existing members |

| Rule of Picking Winning Numbers | Select One      ▽ | Your advert |
|---|---|---|
| | 1) pick 5 numbers from 1 to 20 | |
| | 2) pick 4 numbers from 1 to 10 | |
| | 3) pick 3 numbers from 1 to 10 | |

| Your Shares | | Cost Per Share | | Service charge | | Amount | |
|---|---|---|---|---|---|---|---|

☒ Set your question

| Your Question | |
|---|---|
| Option A | |
| Option B | |
| Option C | |
| Option D | |
| Correct Answer | |

☐ invite friends    ☐ install app and 2D-barcode    ☒ set your passcode     [_____]

☐ I (we) agree with terms and condition

[ Initiate ]   [ Reset ]

FIG 9

Application Form for Joining a Mutual Aid Group

Application No.
Time:
ID:

You had selected the following Mutual Aid Group to join, please review information on the group, if OK, please continue:

| Group ID | | Type | | ☐ sweepstakes<br>☐ contest | Total Shares | |
|---|---|---|---|---|---|---|
| Cost Per Share | | Passcode | | ☒ Yes  ☐ No | Ratio of Passcodes to Shares | |
| Duration of Campaign | | Odds of Winning | | | Stage | Recruiting |
| Total Amount of Prize | | 1st Prize | amount | number | 2nd Prize | amount | number |
| 3rd Prize | amount | number | 4th Prize | | 5th Prize | |

Your Information                                   [Check current members]

| Entity name* | | Kind of Business | |
|---|---|---|---|
| EIN* | | State ID | |
| Product & service* | | Officer's name* | |
| Tel* | | Email* | |
| Street Address* | | | |
| City* | | State* | |
| zip* | | Website | |

| Your Shares | | Cost Per Share | | Service charge | | Amount | |
|---|---|---|---|---|---|---|---|

☒ Set your question:

| Your Question | |
|---|---|
| Option A | |
| Option B | |
| Option C | |
| Option D | |
| Correct Answer | |

☒ Set your passcode [          ]

| Your Advert |
|---|
|  |

☐ I (we) agree with terms and condition    ☐ install app and 2D-barcode

[Add to cart]   [Join now]   [Reset]

FIG 12

Payment Page

User ID:  Transaction No.  Application No.  Time
Summary of your subscription:

| Group ID | | Type | | Total Prize | | Total Share | |
|---|---|---|---|---|---|---|---|
| Passcode | | Duration | | Ratio of P to S | | Available Shares | |
| Name of Business | | Business Classification | | City | | State | | Zip Code | |
| Your Shares | | Cost Per Share | | Service Charge | | Amount Due | |

Your account balance:  xxxxxx  ☐ use balance  [            ]

How would you like to pay?
⊙ credit card

| Name of Card-Holder | |
|---|---|
| Card Number | |
| Certify Number | |
| Expire Date | |
| CVC (3-digit code on the back) | |

○ debit card
○ PayPal
○ gift card
○ checking account          [ Pay ]   [ Reset ]

Confirmation Page: (ask the payer to confirm the payment data)

[                                          [Confirm]   ]

Message to a payer:

| Group ID | Type | Prize | Cost per Share | Duration | Passcode | | Search |

Sort: Prize ∧ ∨    Cost per Share ∧ ∨    Duration ∧ ∨    Release Time: ∧ ∨

```
Group ID: A              Type: Sweepstake
Total Amount of Prize:   Prohibited Area:
Categories of Prize:     Passcode: Yes
Rule of Picking Winning Numbers:
Odds of Winning:         Duration of Campaign:
Start Time:              End Time:
```

```
Group ID: C              Type: Contest
Total Amount of Prize:   Prohibited Area:
Categories of Prize:     Passcode: Yes
                         Duration of Campaign:
Start Time:              End Time:
```

```
Group ID: B              Type: Sweepstake
Total Amount of Prize:   Prohibited Area:
Categories of Prize:     Passcode: No
Rule of Picking Winning Numbers:
Odds of Winning:         Duration of Campaign:
Start Time:              End Time:
```

```
Group ID: D              Type: Contest
Total Amount of Prize:   Prohibited Area:
Categories of Prize:     Passcode: Yes
                         Duration of Campaign:
Start Time:              End Time:
```

FIG 15

| Sponor ID | | Business Name | | Search |

Sort: Shares ∧ ∨    Joining Time ∧ ∨

```
Advert of sponsor A

Business Name of Sponsor A:
Shares:          Joining Time:
```

```
Advert of sponsor B

Business Name of Sponsor B:
Shares:          Joining Time:
```

```
Advert of sponsor C

Business Name of Sponsor C:
Shares:          Joining Time:
```

```
Advert of sponsor D

Business Name of Sponsor D:
Shares:          Joining Time:
```

FIG 16

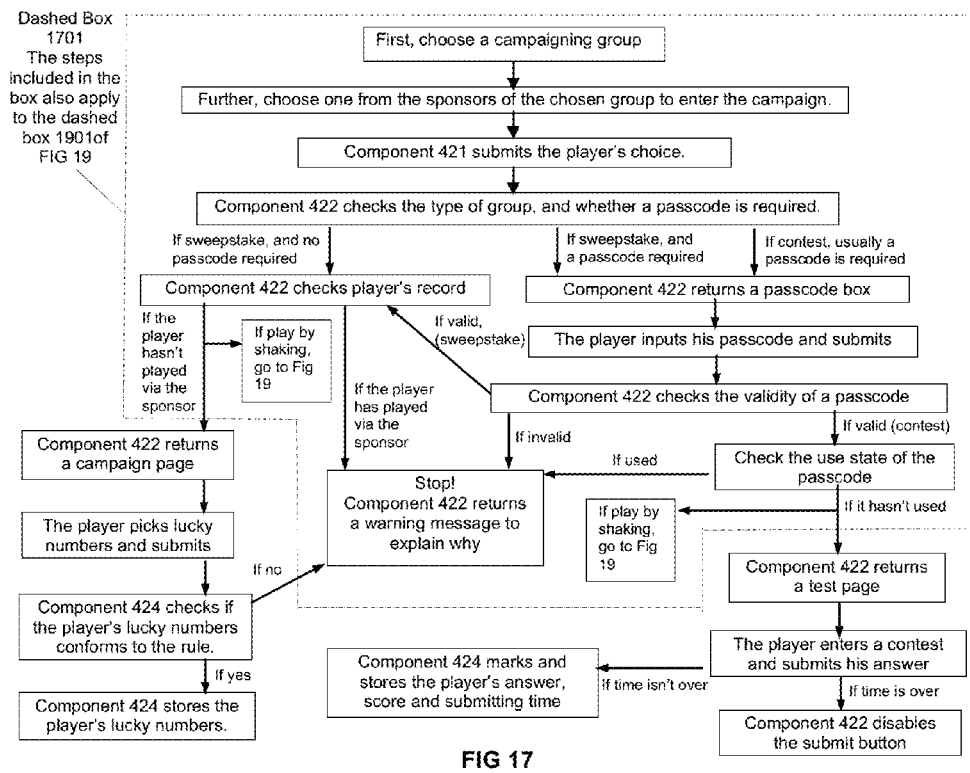

FIG 17

3 Kinds of CAMPAIGN PAGEs

1) If sweepstake and no passcode is required

```
              NO PURCHASE IS NECESSARY
Group ID: A        Sponsor ID:    Type: Sweep
O   I have read and understand rules.
O   I agree with terms and conditions.
Pick 4 figures from 1 to 10 and Input them into 4
boxes below:
|       |       |       |       |       | play  |
```

2) If sweepstake and a passcode is required

| Your Passcode | | submit |

If passcode is valid

```
              NO PURCHASE IS NECESSARY
Group ID: A        Sponsor ID:    Type: Sweep
O   I have read and understand rules.
O   I agree with terms and conditions.
Pick 4 figures from 1 to 10 and Input them into 4
boxes below:
|       |       |       |       |       | play  |
```

3) If contest

| Your Passcode | | Submit |

If the passcode is valid,

Timing will start once you click the "start" button. | start |

```
              TEST PAGE          Test Page Code:      Timing:
Question 1,     Question Code:  xxxxxxxxxxxxxxx
Options:  A, xxxxxxxxx           B, xxxxxxxxxxx
          B, xxxxxxxxx           C, xxxxxxxxxxx      Your Answer   □
Question 2,     Question Code:
                ...
```

FIG 18

Contribution Form

User ID:                Contribution ID:            Contributing Time:

| Contributor's Name | If more than one, separate them using commas. |
|---|---|

Select a category of question: ☒multiple-choice question, ☐math operation, ☐Crossword,
☐Sudoku, ☐image analysis, ☐game

| Question/Title | |
|---|---|
| Option A | |
| Option B | |
| Option C | |
| Option D | |
| Correct Answer | |
| Explanation and Support Materials | |

If the question refers to a picture,   [Upload a picture]   [Submit]   [Reset]

FIG 21

Comment-and-Rate-a-Contribution Page

Contributor's Name:    Contribution ID:    Contributing Time:    Category of question:

| Question | |
|---|---|
| Option A | |
| Option B | |
| Option C | |
| Option D | |
| Explanation $ Support Materials | |

[Comment & rate]   [Get answer]

Current average rating ★★★★

| No. | User ID | Comment | Rating | Time |
|---|---|---|---|---|
| | | | | |
| | | | | |
| | | | | |

Your comment and rating

[                                                          [Submit] [Reset] ]

FIG 22

Post-Creative-Project Form

User ID:          Creation ID:          Time:

| Creator's Name | If more than one, separate them using commas. |
|---|---|

| Project Title | |
|---|---|
| Specification $ Support Materials | |

If the project refers to a picture,   [Upload a picture]      [Post]   [Reset]

FIG 24

Comment and Rate a Creative Project

Creator's Name:          Project ID:          Time:

| Project Title | |
|---|---|
| Specification $ Support Materials | |

Current average rating ★★★★

[comment & rate]

| No. | User ID | Comment | Rating | Time |
|---|---|---|---|---|
| | | | | |
| | | | | |
| | | | | |

Your comment and rate

Rate ★ ★ ★ ★ ★                            [Submit]   [Reset]

FIG 25

Account Page      User ID   [Update]

Your information:

| Name | Sex | Age | Occupation | Tel | Email | Street | City | State | Zip |
|------|-----|-----|------------|-----|-------|--------|------|-------|-----|
|      |     |     |            |     |       |        |      |       |     |

[Update]

Information on your business if you have a business

| Entity name | Business classification | EIN | State ID | DBA | Officer's name | Tel | Email | Street | City | State | Zip | Website |
|-------------|------------------------|-----|----------|-----|----------------|-----|-------|--------|------|-------|-----|---------|
|             |                        |     |          |     |                |     |       |        |      |       |     |         |

Your account balance

| No. | Balance amount | Group ID | Time |        |
|-----|----------------|----------|------|--------|
|     |                |          |      | Refund |

Your shopping cart

| No. | Group ID | Cost per share | Your share | Service charge | Total amount |          |
|-----|----------|----------------|------------|----------------|--------------|----------|
|     |          |                |            |                |              | Checkout |

Your Historical Records:

Subscriptions list:

| No. | Group ID | Current Stage | Your Shares | Application No. | Joining State | Passcode | Application Time | Cancel Time |
|-----|----------|---------------|-------------|-----------------|---------------|----------|------------------|-------------|
|     |          |               | Amend       |                 |               | Download |                  |             |

Clicking here can download passcodes
Clicking here can get the original application form
Clicking here if sponsor wants to amend
Clicking here can get the details of the mutual aid group Initiated self-custom groups list:

| No. | Group ID | Current Stage | Your Shares | Application No. | Initiating State | Passcode | Application Time | Cancel Time |
|-----|----------|---------------|-------------|-----------------|------------------|----------|------------------|-------------|
|     |          |               |             |                 |                  |          |                  |             |

Contributions list:

| No. | Contribution ID | Average rating | Contributing Time | Current state |
|-----|-----------------|----------------|-------------------|---------------|
|     |                 |                |                   |               |

Clicking here can get the details of the contribution

Player's activities list:

| No. | Group ID | Type | Sponsor ID | Lucky Number | Test Page Code | Earned Score | Used Passcode | Playing Time | Result | Claim Time |
|-----|----------|------|------------|--------------|----------------|--------------|---------------|--------------|--------|------------|
|     |          |      |            |              |                |              |               |              |        |            |

Clicking here can get the original test page

FIG 26

Query-Winners Page

Select a Closed Mutual aid group:

| Group ID | Type | Prize | Duration | End Time | | Query |
|---|---|---|---|---|---|---|

List of the Winners
Group ID:     Type:

| No. | User ID | City | State | Lucky Number / Score | Time | Result | Winner's Remark |
|---|---|---|---|---|---|---|---|
| | | | | | | | |
| | | | | | | | |
| | | | | | | | |

FIG 28

Claim Page

First, please provide your claim code, and then submit

| | | | | | | | | | | Submit |
|---|---|---|---|---|---|---|---|---|---|---|

If be confirmed, and continue

Please provide the information on your prize:     User ID:     Claim No.     Time:

| Group ID | Type | Lucky numbers / Score | Category of Prize | Amount of Prize |
|---|---|---|---|---|
| | | | | |

About you

| Real Name | | SSN | | | |
|---|---|---|---|---|---|
| Street | | City | | State | |
| Email | | Tel | | | |

Select a method:
☒ Directly deposit in my checking account
☐ Mail me a check

Information on your checking account

| Name of Bank | |
|---|---|
| Account Name | |
| Bank routing No. | |
| Checking account No. | |

Your remark:

|  |
|---|
|  |

Claim     Reset

FIG 29

Administrative Interface

Maintenance of System:

| Create a Group | Initiated Groups | Contributions | Make-up-Question |

Query and Statistics:

About Mutual Aid Group:

Attribute Options

| Group ID | Type | Stage | Prize | Total Shares | Cost per Share | Subscribed Share | Available Share | Time of Release | Time of change from G to C |
|---|---|---|---|---|---|---|---|---|---|
| Duration | Passcode | Prohibited areas | Rule of picking No | Qualification | Ratio of passcode to share | Winning number | Winning odds | Start time of campaign | End time of campaign |
|  |  |  |  |  |  |  |  |  |  |

| Query | Group ID |    | Grouping time bar chart | Campaign bar chart |

Query Result

| No. | ID | Type | Subscribed Shares | Available Shares |
|---|---|---|---|---|

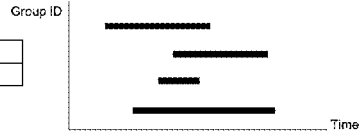

About Sponsors and Initiators:

| User ID | Group ID | Application No | Joining Time | Shares | Passcode | Current State | Payment |
|---|---|---|---|---|---|---|---|
| Name | Classification | Annual Sales | No. of employer | City | State | Zip | Cancel Time |
|  |  |  |  |  |  |  |  |

| Query |

Query Result

| No. | Group ID | User ID | Classification of Biz | Annual Sales |
|---|---|---|---|---|

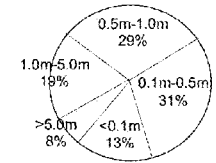

About Players:

| User ID | Group ID | Group Type | Start Time | End Time | Lucky No. | Score | Weighting score | Test Code | Passcode |
|---|---|---|---|---|---|---|---|---|---|
| Result | Claim Time | Claim Code | Sex | Age | City | State | Zip | Education | Occupation |
|  |  |  |  |  |  |  |  |  |  |

| Query |

Query Result

| No. | Group ID | Group Type | Player's ID |
|---|---|---|---|

About Question Bank  | Get statistics |

| Total Number | Category 1 ||| Category 2 |||
|---|---|---|---|---|---|---|
|  | Difficult | General | Simple | Difficult | General | Simple |
|  |  |  |  |  |  |  |

FIG 30

SYSTEM AND METHOD FOR SHARING A PRIZE PROMOTION

This invention uses the transmission of our provisional patent application No. 62/065,751, Filed 19 Oct. 2014.

TECHNICAL FIELD

The present invention is related to a computer-implemented system and method based on networks, especially to such a system and method for sharing a prize promotion (a sweepstake or a contest) by grouping a plurality of small businesses together to form a grouping unit for jointly running a collective prize promotion.

BACKGROUND OF THE INVENTION

To promote a product or a service a business usually has to advertise, to increase sales and the popularity of a product the business need also do advertising, so, various advertisements have become ubiquitous. On the other hand, in the today's world flooded with the advertisements, general consumers seam to be experiencing "advertising blindness", and they pay attention to the mediocre advertisements less and less. The advertising effectiveness appears uncertain. In this context, running a prize promotion like a sweepstake or a contest finds favor with a number of businesses because the prize promotion can more effectively attract public attention to them and their products. A research report said that 49% of the consumers logged onto the Internet at least once per month to enter the sweepstake; 24% of the consumers made their first online purchase based on the attractive sweepstake; and 76% of commercial sites named the sweepstake or the contest as their preferred method of the promotion. These facts indicate that the prize promotion has become a significant method and a popular way to promote a brand, to increase sales and to drive traffic. Particularly at present, the boom of electronic commerce sets a broader stage for the prize promotion.

As stated above, there are two main types of prize promotion, i.e. the sweepstake and the contest. This classification is based on the type of the prize promotional campaign. Regardless of which type, however, it is important to comply with the laws and regulations as running the prize promotion. According to federal, state, and local laws the sweepstakes or the contest becomes a "lottery", and thus, illegal, if all of the following three elements are present:

Prize—A prize is always present in such promotions.
Consideration—Consideration generally means that an entrant has to make a purchase or a payment or in some states do something substantial.
Chance—A chance means that a winner is selected at random.

Since the prize is always present in such promotions, one of the other two elements must be eliminated to avoid violating the laws. The difference between the sweepstake and the contest is just which element is eliminated. For the sweepstake, because a winner is selected by drawing of chance, the consideration must be eliminated, and thus the organizer of the sweepstake can't require a player to pay, purchase or do anything substantial for playing the game, while for the contest, a winner is selected on the basis of player's skill rather than the chance, so the chance has be eliminated, and thus it is allowed to require a payment or a purchase to enter the contest in most states. A business may choose a suitable type of prize promotion according to its need. The sweepstake and the contest are popular with the businesses and the consumers. However, at present there are some problems hindering the more widespread and more effective utilization of the prize promotion.

Problem 1, UNFAIRNESS: The sweepstake and the contest have large appeal. That is because they provide an opportunity to win the attractive prize. However, at present only those large businesses are able to run the sweepstake or the contest, but most of small businesses haven't the wherewithal to solely bear the high cost of the prize promotion. Supposing the annual sales of a restaurant can reach 1 million based on its operating condition, and the maximum profit is 100 thousand, how much money could the restaurant spend on the promotion? McDonald can offer a million as the prize for promoting its hamburger, but a local individual burger shop near a McDonald store can't bear such a high cost; that is to say, it can't do this only by itself because of lack of its wherewithal. The small business can afford some small gifts at most, but the small gifts can't compare with the large prize in attracting the consumers. Obviously, the small business is in an unfair and unfavorable position in running the promotion and market competition.

Problem 2, HARD CONTEST: As mentioned above, if a business desires its customers to make purchase while it runs a prize promotional campaign, it can only run the contest rather than the sweepstake to comply with the laws. To run a genuine contest the test question must really be able to test the player's skill, but isn't as simple as 1+2=? For a contest, it is the requirement that only a few players can win. If a number of players can pass the test, and finally to select the winners by the chance, the campaign isn't the genuine contest, but is the sweepstake. This is illegal. So, to run the genuine contest the business must build a professional test question bank and an executive system. This is very difficult for the small businesses, even for a big company because they lack necessary professional and technical resources. Maybe someone suggests employing a professional team. This is a good idea, but to employ the professional team to build the professional question bank and its corresponding executive system the business will have to spend lots of money. This indicates running the contest is more difficult and more complex than running the sweepstake. The business clearly knows that running the contest can increase even more sales, but they have to select the sweepstake. This is just the reason why the utilization of the contest is less than the utilization of the sweepstake in the prize promotional campaign. Some professional exams are well known, such as TOEFL (Test of English as a Foreign Language) and CPA (Certified Public Accountant) exam, as well as other intelligence exams. Unfortunately, no business can use anyone of them for the promotional contest. The reasons are that the systems of these exams and tests don't relate to running the prize promotion structurally. The professional exam is a close system and focuses on a professional field. Nobody can rent or share the exam and test systems. For example, if a business wants to hire accountants, the business can't rent the CPA exam system to test its candidates because the system structure of the professional exam isn't open to the businesses.

Problem 3, TOO HIGH COST: To run the prize promotion the business need do a lot of works: issuing tickets for the promotion, collecting the tickets, drawing winning numbers, selecting winners, particularly for the contest also including building the professional test question bank and marking an answer and so on. This must put a lot of labor and materials into the promotion, and the question bank doesn't often be used, this results in a higher operational cost and the waste of the resources. As mentioned above, if the business employs really the professional team it will have to spend lots of money. Without doubt, it is impossible to do so for overwhelming majority of the businesses particularly for the small businesses.

Problem 4, DECEIT: Certain deceitful matters occurred occasionally in the prize promotion. These deceitful matters mainly involve the following three aspects: First, some businesses ran a false contest deliberately or accidentally, for example, a false testing question may be so simple that everybody can answer, say, 1+2=?, that is to say, the question isn't a question at all. Finally a winner is still selected by drawing of chance or according to the business's discretion, and their purpose is just to intend to increase their sales by running such a nominal contest. The nominal contest complies with the laws in form, but it is still the sweepstake in fact. Obviously, this deceit is illegal. Second, some dishonest businesses didn't make good on their promises for the prize after the prize promotions ended. The promised prize finally becomes irredeemable. Third, some dishonest businesses set winning numbers in advance and divulge the numbers to their friends, even didn't set the winning numbers at all so that nobody would win the prize forever. Similarly, they can divulge their test questions and correct answers to their own preferred person.

Problem 5, DIFFICULTY OF UNION: Maybe a business can unite with other acquainted businesses by the personal relationship to share the prize promotion, but in this way the number of united businesses is always limited. In fact the more the number of businesses is, the less the cost born by each member is. Besides, the union is quite localized, but most of the businesses don't like to see their neighbors running a similar prize promotion at the same time in the same area because that will poach their customers and thus reduce the effect of their promotion. If there is a public platform that enables those unacquainted businesses to easily come together, it will overcome the difficulty. Though some websites collect the various prize promotions on their own websites, they only provide information about the prize promotions and links leading to the prize promotions. The prize promotions don't really run on the collectors' websites. The collectors don't manage the promotions, in fact, are unrelated to the promotions at all. The promotions are exclusive separately to one business, and don't recruit any new member.

Problem 6, SCATTER: Up to now the prize promotions are separately operated by some businesses and run in their respective sites in isolation from each other. Under this condition, it isn't easy to attract the public attention because the public doesn't know where the business and its promotion are. Usually the business has to do additional advertising to announce its promotion. This must increase the cost and reduce the effect of the promotion. Why do the consumers like to go to the trade show or the shopping mall? That is because there are a number of selectable shops concentrated there. Why do the businesses like to go to the trade show? That is because there is very heavy traffic there. So, for the prize promotion, either the business or the consumer expects such a place to enable the businesses and the consumers to converge.

Well then, is there any PRIOR ART that can solve the above problems? No good solution is found. Herein we can only cite two farfetched examples: the Groupon and the Kickstarter. The Groupon provides a platform for buyers to buy something in the form of a group for a wholesale discount. The Kickstarter is a funding platform for creative projects. On the Kickstarter anyone is eligible to launch a project. If someone likes the project, the one may pledge money to the project to make it happen. The Kickstarter creates a way for creators and audiences to work together to make a thing. When many backers jointly fund one project, it becomes to pool more small funds for a great task. Both provide a platform that enables the buyers and the backers to easily come together for a certain purpose, that is to say, they solve one of the above difficult problems, but they both can't solve the other problems. In fact they don't relate to the prize promotion because they lack the infrastructure of running the contest and the sweepstake.

TECHNOLOGICAL BACKGROUND: Generally, the majority of the small businesses don't know each other, and their business classifications are various, and they locate likely in different cities and areas. It is quite difficult to let lots of small unrelated businesses come together before the computer and the Internet arose, but with progress of the Internet technology and the client-server network architecture, it has become possible and very easy. The Internet comprises a vast number of computers including mobile devices and various computer networks interconnected by wire or wireless communication links. The interconnected machines exchange information and data using various services, such as the World Wide Web (WWW), Wireless Application Protocol (WAP), e-mail, Instant Communication, File Transfer Protocol (FTP), and so on. The World Wide Web service allows a server system to send graphical webpages of information to a remote client system, and the client system can then display the webpages. Each resource of WWW, such as a computer or a webpage, is uniquely identifiable by a Uniform Resource Locator (URL). To view a specific webpage a client has to specify the URL for that webpage in a request, e.g. a Hyper Text Transfer Protocol (HTTP) request. The request is forwarded to the web server system supporting that webpage by a browser. When that server system receives the request, it should send that webpage to the client system, and after receiving the webpage the client system typically displays that webpage by the browser. The client-server network architecture provides the technological base of solving the above difficult problems hindering the development of the prize promotion.

OBJECTS AND ADVANTAGES

Accordingly, the objects and advantages of the present invention are:

1. to provide a system and method which includes a grouping unit called a mutual aid group. Using the mutual aid group the present system and method can group a plurality of small businesses together to jointly run a collective prize promotion. In the present system an administrator or one business can create the various mutual aid groups and recruit the other more small businesses into the mutual aid group without considering their business classification, size and locality. All the businesses joining the mutual aid group share the collective prize promotion and share in its cost. A million dollars is an astronomical figure for a small business, but if the million dollars is divided into 100 or more shares, in other words, if 100 or more small businesses share in the cost of the million prize, each of them only contributes 10 thousand or even less to the collective promotion. This is easier to the small businesses. Under this condition each member of the mutual aid group only bears a smaller and affordable cost, but every members can benefit from running the collective prize promotion as the big business can do. The small businesses can still promote their respective products and services as the mutual aid group runs the promotional campaign, and all consumers can get the same chance to win the promotional prize no matter they enter the campaign via which member, say, a restaurant, a small grocery, or a clinic. So, even a very small grocery store can run a million-prize promotional campaign as long as the small store has participated in the mutual aid group as a member and borne its share of the promotional prize. This must fully changes the position of the small businesses in promotional competition with those big businesses from an UNFAIR position to a FAIRER position.

2. to provide a system and method which includes a test question bank. The question bank provides enormous test questions, puzzles, and games that are used to test the skill of the entrants. The question bank is structurally embedded in the present system, and is fully under the control of the present system and executes the instructions of the present system. The present system integrates the question bank with the mutual aid group stated above to form an organic whole serving the promotional contest. Unlike those professional exams mentioned in Problem 2 Paragraph, in the Background Chapter, the test question bank is designed to become a specific question bank being suitable for the promotional contest under the control of the present system. And the test question bank doesn't serve only a single business, but is open to all the businesses that intend to run the promotional contest. From the foregoing analysis, the promotional contest is useful for sales growth, but the businesses use it rarely because of the difficulty of operation. Since the present system provides the support to the question bank in structure and is open to everybody, those businesses lacking competence to run the contest will no longer be bothered about the HARD CONTEST, and they may utilize the ready-made test question bank for their promotional contest. The present system and method with the test question bank makes running the promotional contest EASIER, and thus it will change the situation of running the promotional contest harder than running the sweepstake.

3. to provide a system and method which includes a set of executive programs. The executive programs execute the grouping task, the campaigning task, and the controlling task. The grouping task includes creating the various mutual aid groups, recruiting the small businesses into the mutual aid group, processing payment etc.; The campaigning task includes processing the request for entering the campaign, forming a promotional page, drawing winning numbers, marking the answer of the entrants, selecting winners, etc.; The controlling task includes starting the promotional campaign in time after the all the shares of one mutual aid group are sold; closing the promotional campaign when the preset end time comes, etc. In a word, the present system directly manages the operation of the mutual aid group in its whole lifetime from its birth to its end. Thus it can be seen that all the routines of operating the prize promotion are completed by the present system, while the businesses do nothing for their prize promotional campaigns except to join the mutual aid group and deposit the prize liability and the service charge. This greatly cuts down the labor and material cost of the prize promotion for the businesses. It is common sense that utilizing a communal resource is more economical than building a private like resource. Since the present system has included the test question bank, the businesses needn't go to the expense of building a private question bank, and they may rent the open test question bank of the present system at a LOW COST. Taking the advantages of the present system and method, more and more small businesses will prefer to select the contest for their promotion because the contest can bring more great sales growth, while its cost becomes affordable due to using the present system and method.

4. to provide a system and method which includes a mechanism for PREVENTING DECEITFUL MATTERS. As stated in Problem 4 Paragraph above those deceitful matters mainly involve the three aspects. The mechanism is to resolve the deceitful matters. First, all the test questions of the test question bank are set by the professionals to ensure that every test question meets legal, moral and professional requirements, and is able to verify the player's skill, and only a few player can pass the test. So the winners are automatically selected by the present system based on the player's skill and the rules, but not according to the business's discretion. Second, the present system and method require that anyone must synchronously deposit its share of the prize in the present system (the third party as an organizer) when it joins one mutual aid group, that is to say, all of the sponsors must have deposited their payable money before the promotional campaign starts. So, the prize of the mutual aid group running in the present system must be redeemable. Third, under this mechanism the winning numbers are drawn after the campaign ends by the present system but not by any business, and thus nobody can get the winning numbers before the campaign ends. In addition the present system limits a staff's access to the test question bank. An administrator of the present system can only access the test questions made up or examined by him/her, but not access the other test questions. So, the staff can learn the limited part of the test questions at most, but can't master the whole. The mechanism will technologically prevent from divulging the test questions and the correct answers.

5. to provide a system and method which forms a platform for union being based on the client-server network architecture, and has a qualification-checking mechanism. As stated in Problem 5, DIFFICULTY OF UNION above, the union relying on the personal relationship is always limited and quite localized. Our platform for union is open, and can reach any locality over the Internet, and thus those unacquainted businesses can easily come together to run the collective prize promotion by joining the mutual aid group on the platform. The qualification-checking mechanism is to better optimize the composition of the mutual aid group. The businesses don't like to see their neighbors running a similar promotion at the same time in the same area because that can poach their customers and thus reduce the effect of their promotion. Under this mechanism the mutual aid group may have a limit to the number of recruit in the same area and/or to the business classification. For example, the mutual aid group can only recruit one sponsor in each city, or to limit to the different business classification in the same area to protect the interest of the business. The disqualified businesses will be declined. The present system and method has such an ability to provide a real platform for the EASY AND QUALIFIED UNION.

6. to provide a system and method which forms a big concentrative promotion market. The present system has a multitask-processing mechanism. Under this mechanism the present system and method let the administrators create various mutual aid groups to meet the different needs of sundry small businesses, and also allow the businesses to initiate a self-custom mutual aid group to fully meet the special needs of some businesses. For example, some businesses know more exactly their own industries, or they all are the members of an organization, and they can even more clearly know what they need; they can more properly determine what prize they can offer; how many shares they need; what type of promotional campaign they expect and so on based on their experience, finances and the number of members. So, there are lots of mutual aid groups and the promotional campaigns simultaneously and continuously running in the present system. This results in the CLUSTER effect, but the SCATTERED promotions described in Problem 6 Paragraph above don't have the effect. From this point of view, the present system looks like a trade show or a shopping mall. The trade show provides the businesses with booths, and the present system provides them with the various mutual aid groups. On the trade show the businesses advertise and sell their products using the booths, and in the present system the businesses run their prize promotions using the mutual aid groups. The same point is that the mutual aid groups and the booths are separately concentrated in a bigger space. Lots of booths gather on the trade show, while all the mutual aid groups and their prize promotional campaigns are concentrated in the present system. The websites collecting and providing information about the prize promotion don't really operate the promotional campaign, and naturally loses the effect. The CLUSTER effect can motivate a number of businesses, buyers and players to converge together. So, the promotion can reach wider audiences in the present system than in any isolated place.

Other objects and advantages are:

7. to provide a system and method which provides a mechanism for the business to set a test question relating to its business to advertise its product and service, and placing the question to the test question bank. The mechanism will bring more advantages to the business because answering a question can impress a customer more than reading an advertisement.
8. to provide a system and method which provides a mechanism for encouraging the public to contribute a test question, a puzzle or a game to diversify and enrich the source of the test question and to keep the test question bank endlessly expansive and always fresh. This will excite the public's enthusiasm and bring more supporters to the present system to increase the CLUSTER effect.
9. to provide a system and method which provides a mechanism for limiting frequency of a player playing the same game via the same sponsor to ensure that every sponsor can impartially be visited.
10. to provide a system and method which includes a byproduct called the Biz Finder. Since the information about lots of businesses is stored in the present system, the user can find one business using the Biz Finder.

Further, the objects and advantages of the present invention will become apparent from a consideration of the drawings and ensuing description.

BRIEF DESCRIPTION OF DRAWINGS

FIG. 5 is a diagram showing a webpage containing a sample creation form for an official administrator to create a mutual aid group, referring to drawing 4/22.

FIG. 7 is a table describing the several developing stages of a mutual aid group and the transformational condition of the stages, referring to drawing 6/22.

FIG. 8 is a diagram showing a webpage that contains a sample registration form for a user to register, referring to drawing 6/22.

FIG. 9 is a diagram showing a webpage that contains a sample initiation form for an initiator to initiate a self-custom mutual aid group, referring to drawing 7/22.

FIG. 12 is a diagram showing a sample webpage containing an application form for a joining a mutual aid group, referring to drawing 9/22.

FIG. 14 is a diagram showing a webpage containing a sample payment form used for a potential sponsor to pay, referring to drawing 11/22.

FIG. 15 is a diagram showing a webpage presenting all the retrieved mutual aid groups being at the campaigning stage for a player to choose, referring to drawing 12/22.

FIG. 16 is a diagram showing a webpage presenting all the sponsors within the chosen campaigning mutual aid group for a player to choose one, referring to drawing 12/22.

FIG. 17 is a flow diagram illustrating the process flow of how a player enters a campaign under different conditions, referring to drawing 13/22.

FIG. 18 is a diagram showing the samples of the several different types of promotional campaign, referring to drawing 13/22.

FIG. 21 is a diagram showing a webpage containing a contribution form for a contributor to contribute a test question or a puzzle, referring to drawing 16/22.

FIG. 22 is a diagram showing a sample comment-and-rate-a-contribution webpage, referring to drawing 16/22.

FIG. 24 is a diagram showing a webpage containing a sample post-creative-project form for a creator to post his/her creative project, referring to drawing 18/22.

FIG. 25 is a diagram showing a sample comment-and-rate-a-creative-project webpage, referring to drawing 18/22.

FIG. 26 is a diagram showing an account page of recording the whole activity history of a user as a sponsor, an initiator, a contributor, and a player for the user to review and/or amend, referring to drawing 19/22.

FIG. 28 is a diagram showing a webpage containing several search boxes for a user to query winners, referring to drawing 21/22.

FIG. 29 is a diagram showing a claim-prize page for a winner to claim a prize, referring to drawing 21/22.

FIG. 30 is a diagram showing a sample administrative interface of performing the tasks of administering the present system and method, referring to drawing 22/22.

SUMMARY OF THE INVENTION

Figure 1:
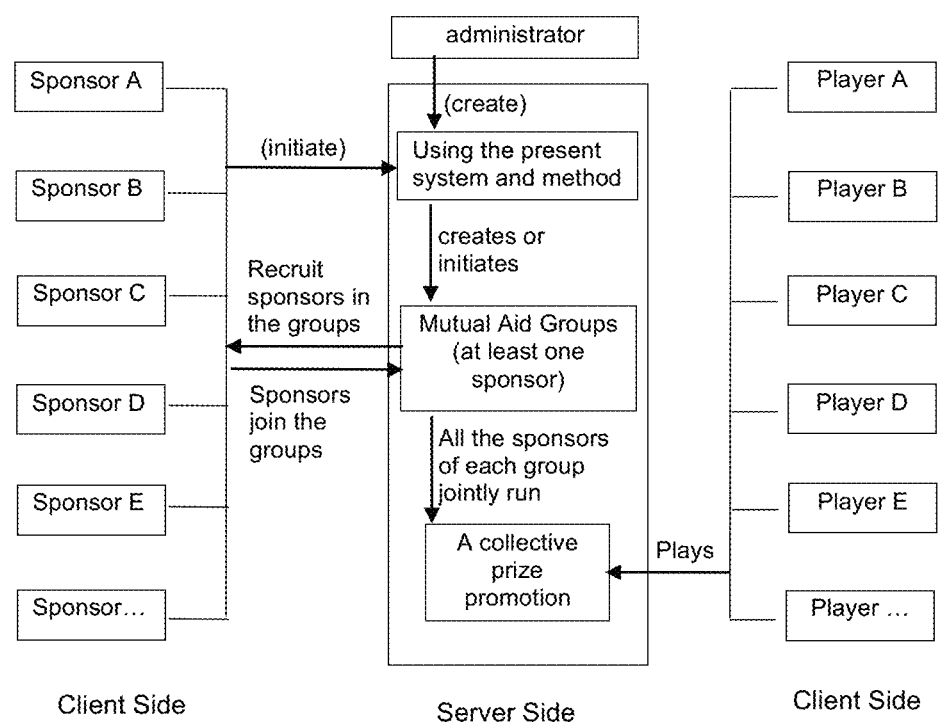
FIG. 1 is a schematic diagram briefly illustrating how the present system and method works, being able to be used as the Front Page Drawing, referring to drawing 1/22.

The present invention creates the system and method for sharing a prize promotion (i.e. a sweepstake or a promotional contest) by grouping a plurality of small businesses together to form a grouping unit to jointly run a collective promotional campaign. The present system comprises various grouping units, a test question storage, and a set of executive and controlling programs. The grouping unit (being called the mutual aid group herein) is used for grouping a lot of small businesses together to form a group for jointly running the collective promotional campaign. The grouping unit is created by the administrator of the system or is initiated by a business, and other businesses may request for joining the grouping unit when the grouping unit is recruiting. The test question storage (called the test question bank herein) includes a large number of test questions, puzzles, and games used to test the skills of entrants in the promotional contest. The executive programs are to perform the tasks of grouping lots of small businesses together and running the collective prize promotional campaign using the grouping unit and the test question storage. The controlling programs are to control the executive processes of the tasks and the transformation of the processes.

To sum up, the key points of the present system are as follows: (A) The present system is hosted in a server system; (B) The administrator of the present system or any business creates various mutual aid groups and releases them in the server for recruiting other businesses in the mutual aid group to group them together; (C) Any business (sponsor) being ready to share in the cost may request to join the mutual aid group to become a member of the mutual aid group; (D) The mutual aid group runs a collective promotional campaign for all the members of the mutual aid group; (E) A player can enter the campaign run by the group through whichever member of the mutual aid group and have the same chance to win the prize, referring to FIG. 1. The following detailed descriptions will explain how the present system and method works in the client-server architecture based on the communication networks.

DETAILED DESCRIPTION OF THE PRESENT SYSTEM

The following description is presented to enable any person skilled in the art to make and use the invention. For purposes of explanation, the specific nomenclature is set forth to provide a thorough understanding of the present invention. The descriptions of the specific applications are provided only as examples. The present system includes both resource elements and executive and controlling elements in structure. The resource elements mainly include the various mutual aid groups and the test question bank. The executive and controlling elements are the important guarantee of the implementation of the functions of the resource elements.

The typical client-server architecture comprises a server system and a plurality of client systems interconnected by various communication networks. In the context of the communication networks like the Internet, essentially, the server system acts as a service and resource provider, and the client can make a request for the service or resources from its client system. The present system is just hosted in such a server system, and anyone can request the service and resources provided by the present system through his client system. The following description will detail the roles that the server system, the client system, and the administrative interface individually play in the present invention and the relationship between the resource elements and the executive and controlling elements of the present system, referring to FIG. 2.

Figures 2, 3:
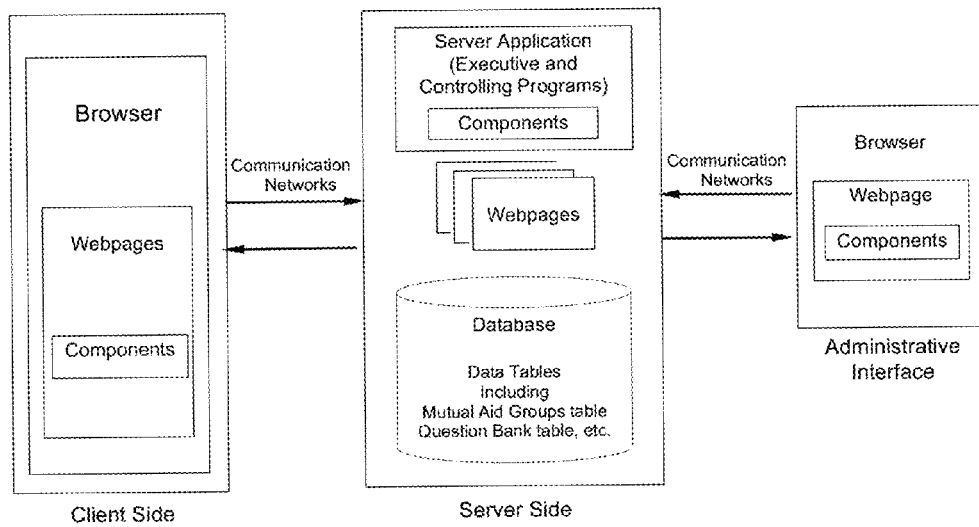
FIG. 2 is a block diagram illustrating a client-server architecture as the technical basis of the present system and method, referring to drawing 2/22.
FIG. 3 is a diagram showing a sample webpage with a navigation bar comprising some buttons individually containing a hyperlink linking to a special resource, referring to drawing 2/22.

The server system as software basically includes server applications and a database. The database includes some data tables, and a great deal of information and resources are stored in the data tables. The resource elements of the present system like the mutual aid groups and the test question bank are separately put in the data tables. A webpage is a carrier of the information and resources. The server application is a core of the server system. It can execute the command to query and retrieve the database at a user's request, then create the webpage containing the information and the resources requested by the user and return it to the user. The executive and controlling programs mentioned above is an important part of the server application. FIG. 3 shows a sample webpage.

The client system executes a web browser program. The browser plays an important role of exchanging information with the server system for the client and provides the local service. It can send a user's request for the certain information or the resources to the server system, then display the webpage containing the information and the resources returned by the server system. So, the client-server system is also called the browser-server system. The web browser allows the user to enter an address of a specific resource to locate the resource and finally to display the webpage containing the resource, and the address is referred to as Uniform Resource Locator (URL). In addition, a hyperlink provides an automated way to request a resource that replaces the user's entering the URL of the resource. A button, a text box, an image, and one or several words on the webpage can include the hyperlink. When a user clicks the hyperlink to another webpage, the browser can locate and display the webpage. The browser also allows a user to submit a form for providing more interaction with the database of the server system. In the present system, the user can request by the browser the resource provided by the present system such as the mutual aid group. For example, a sponsor can request for viewing all the mutual aid groups and joining a mutual aid group, and a player can request to enter the campaign run by a mutual aid group.

The administrative interface is used for managing the whole system and method of the present invention. The administrative interface can interact with the server system as the client system does with the server system, but the administrative interface devotes itself to managing some background tasks such as creating and releasing the mutual aid group, examining the self-custom mutual aid group initiated by an initiator, managing the test question bank, adjusting the frequency of releasing the mutual aid group, and maintaining the executive system, etc.

Figure 4:
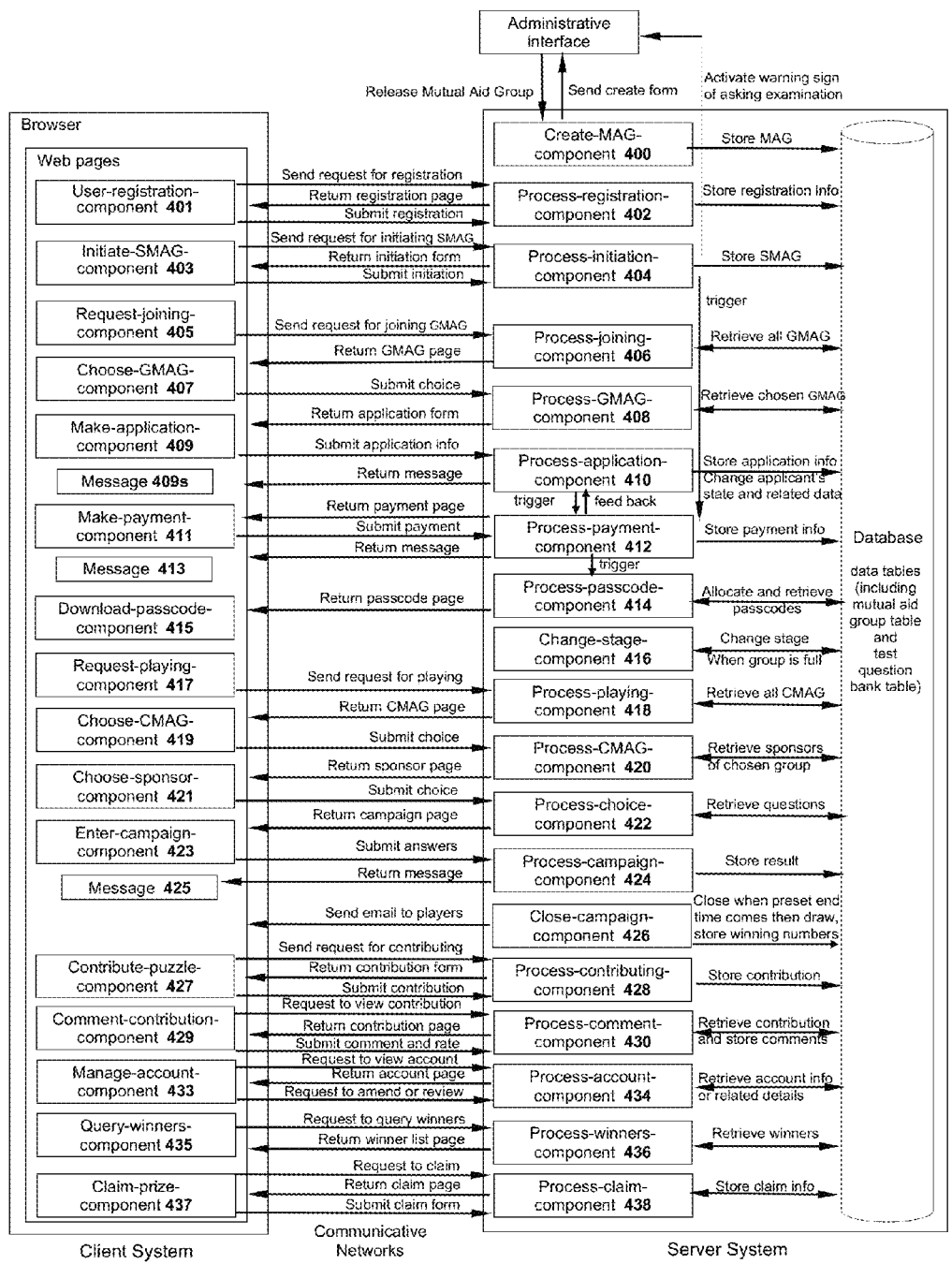
FIG. 4 is a flow diagram illustrating every component of the embodiment of the present system and the relationship among the components and the process flow capable of satisfying the business need of the present system and method, referring to drawing 3/22.

The following description details how the executive and controlling elements affect the implementation of the function of the resource elements. As stated above, the resource elements including the mutual aid groups and the test questions are separately put in the data tables in the form of data record. Each record represents one mutual aid group or one test question in the data tables. Both the mutual aid group and the test question are the resources provided by the present system, and they don't directly interact with the outside, but done by the executive programs. The executive programs are a set of applications that can process businesses of using the resources. If a user wants to use the resources, say, to join a mutual aid group, the user needs the executive programs to execute the business tasks of joining the group. The user must send a request to the server system using the executive programs. In response to the request, the executive programs in the server system can help the user to query whether the mutual aid group is at the grouping stage, and return an application form and a payment form, and finally make the user a member of the mutual aid group, etc. This shows that many business tasks need to be done in the processes of using the resource like the mutual aid group. And the controlling programs are used to control the processes. Under different conditions and at the different stages of the mutual aid group the executive programs and the controlling programs will perform different tasks. So, the executive and controlling programs are usually broken into a certain number of components based on the different tasks, and each of the components executes their own specific tasks. Since the present system and method runs in the client-server architecture, the components separately run on the server side and the client side based on the their respective task. FIG. 4 illustrates the components of the present system in detail, and the relationship among these components, and the business processes capable of satisfying the need of the present system and method. The components of the client side usually work with the browser together, and they can communicate with each other or with the corresponding components of the server side by the web browser, say, respond to a user's clicking or other action and thus trigger the browser to send a request to the server system. The components of the server side can respond to the user's request and retrieve related data from the database to form a webpage, and then return the user the webpage. The facts indicate the client-server architecture can ensure the implementation of the function of the present system and method. The following list is to explain the components and their functions. They are listed in order of the business processes. To avoid confusion, herein, the components running on the client side are labeled with odd numbers, and the components running on the server side are labeled with even numbers, referring to FIG. 4. The components include:

a create-MAG-component 400 that can respond to an administrator's request for creating a mutual aid group by sending a creation form to the administrator, and then receive the mutual aid group created by the administrator and store it into the data table of the database, and trigger the passcode generator of the system to generate a series of passcodes if the group requires the passcodes, a user-registration-component 401 by which a user can send a request for registration and, further, complete and submit the registration form sent by process-registration-component 402, a process-registration-component 402 that can return the registration form to the user after receiving the user's request for registration, and then receive and store the user's registration info including the personal and business information, an initiate-SMAG-component 403 by which an initiator can request to initiate a Self-custom Mutual Aid Group (SMAG), and then fill in and submit the initiation form sent by process-initiation-component 404, a process-initiation-component 404 that can respond to the initiator's request for initiating a self-custom group by sending the initiation form to the initiator and store the self-custom mutual aid group in the data table of the database after receiving the initiation form, then trigger process-payment-component 412 to return a payment page for the initiator to pay and activate a warning sign on the administrative interface to ask for an examination if the initiator paid successfully, a request-joining-component 405 which enables a potential sponsor to send a request for joining a Grouping Mutual Aid Group (GMAG) being at the grouping stage, a process-joining-component 406 that can retrieve all grouping mutual aid groups from the database in response to the potential sponsor's joining-GMAG-request and then return a GMAG webpage containing all the mutual aid groups being at grouping stage for the sponsor to choose a preferable group, a choose-GMAG-component 407 that receives the GMAG webpage and displays all the grouping mutual aid groups for the potential sponsor to choose a preferred one and submit the choice to the server system, a process-GMAG-component 408 that can retrieve the information on the chosen mutual aid group from the database after receiving the sponsor's choice, and return an application form with the information on the chosen group for the sponsor to apply for joining the group, a make-application-component 409 that receives and displays the application form sent by process-GMAG-component 408 for the potential sponsor to fill in the form and file the application for joining the chosen mutual aid group, a process-application-component 410 that will examine the application form and store the information on the application in a data table of the database if no error, and then trigger process-payment-component 412 to send a payment page for the applicant to pay, or send a message 409s to explain why if any error, a make-payment-component 411 that can receive and display the payment page to enable the potential sponsor or the initiator to make payment for joining the chosen mutual aid group or for initiating the self-custom mutual aid group by completing a payment procedure, a process-payment-component 412 that is triggered by process-application-component 410 or process-initiation-component 404 to return the payment page for the potential sponsor or the initiator to pay and then perform the payment procedure after receiving the payment page and store the payment data, further, if the payment is successful, should feed back the successful state of the payment to process-application-component 410 to change the joining state of the potential sponsor or to process-initiation-component 404 to activate the warning sign asking for examination, and store the changes, and then trigger process-passcode-component 414 if the group requires passcodes, and then will send a message 413 to confirm or to explain why if any question, a process-passcode-component 414 that is triggered by process-payment-component 412 to allocate the passcodes based on the share which the sponsor or the initiator has subscribed for, and then retrieve the allocated passcodes to create a passcode page, and then returns the passcode page for the sponsor or the initiator to download or print the passcodes if the mutual aid group requires the passcode, a download-passcode-component 415 that enables the sponsor or the initiator to receive the passcode page from the server system and download or print the passcodes equivalent to the sponsor's or the initiator's share, a change-stage-component 416 that is triggered to transform the stage of the mutual aid group from the grouping stage to the campaigning stage once the accumulative number of sold shares of the mutual aid group reaches its total share, and immediately sets the start time and the end time of the promotional campaign, a request-playing-component 417 by which a player can send a request to the server for playing a sweepstake or a contest run by a Campaigning Mutual Aid Group (CMAG) being at the campaigning stage, a process-playing-component 418 that will first check the player's real age and address after receiving the player's request for playing and, if the player reaches the legal playing age and doesn't live in a campaign-prohibited area, then retrieve all the campaigning mutual aid groups (CMAG) from the database and return the CMAG page containing all the mutual aid groups being at the campaigning stage for the player to choose a preferable one, a choose-CMAG-component 419 that enables the player to choose a preferable one from the various campaigning mutual aid groups, and then submit the choice to the server system, a process-CMAG-component 420 that will retrieve all the sponsors of the chosen mutual aid group from the database after receiving the player's choice, and then create and return a sponsor page containing information about all the sponsors of the chosen campaigning mutual aid group for the player to choose one sponsor, a choose-sponsor-component 421 that can display the sponsor page with all the sponsors of the chosen group for the player to choose one from these sponsors and submit the choice to the server system, a process-choice-component 422 that should first give the player a passcode input box after receiving the player's choice if the mutual aid group requires a passcode, and then return different campaign pages, either a sweepstake page or a contest page, according to the type of the mutual aid group, a enter-campaign-component 423 that can receive and display the campaign pages to enable the player to play the sweepstake by picking lucky numbers or to enter the skill contest by solving the test questions, then to submit the numbers or the answers to the server system, a process-campaign-component 424 that should store the player's lucky numbers or mark the player's answers based on the marking criteria and store the result after receiving the player's answers, and record some parameters for the player's behavior such as a playing time, and send a massage 425 to inform the player of the result and other details, a close-campaign-component 426 that is triggered to transform the stage of the mutual aid group from the campaigning stage to the closed stage once the preset end time of the campaign comes and, if the sweepstake is closed, to randomly draw a set of winning numbers based on the designed algorithm and the rule of drawing winning numbers and store the winning numbers, a contribute-puzzle-component 427 by which anyone can send a request for contributing a test question, or a puzzle, or game, and then complete and submit the contribution form returned by process-contributing-component 428 of the server system, a process-contributing-component 428 that can send the contributor the contribution form in response to the contributor's request for contributing, and store the contribution in the database after receiving it, a comment-contribution-component 429 by which anyone can send a request for viewing the contributed test questions and puzzles, and try, comment and rate any contribution, and then to submit the comment and rating, a process-comment-component 430 that will retrieve and return all the contributed test questions and the puzzles that are in the consulting period in response to the user's request, and should store the comment and rating in the database after receiving the comment and rating, and work out the average rating of each contribution every time receives the comment and rating, and then remove those contributions with a lower rating and upgrade those contributions with a higher rating when the consulting period ends, a post-creative-project-component 431 by which anyone can send a request for posting a creative project, and complete and submit the post-creative-project form returned by the server, or for commenting and rating the project, and complete and submit the comment form, a process-creative-project-component 432 that can return the creator the post-creative-project form in response to the creator's request for posting, then store the project in the creation data table, or retrieve all the creative projects in response to the user's request for commenting and voting, further, will work out the average rating of each project and store the comment and rating into the database, (component 431 and component 432 are similar to the components 427, 428, 429 and 430 in function, so they aren't shown in FIG. 4 to save space), a manage-account-component 433 by which a user can send a request for viewing the user's account that records the user's history of using the present system including the activity of the user as a player, the subscription of the user as a sponsor, the initiating event of the user as an initiator and the contribution of the user as a contributor, and perform management tasks such as amending the number of shares or reviewing the player's previous test page, a process-account-component 434 that will return an account page to the user in response to the user's request and, moreover, retrieve the previous application form for joining or initiating for the user to amend, or the original test page for the player to review, or the passcode page for the user to download, and so on if the user requests to do that, a query-winners-component 435 by which a user can send a request for querying winners of a closed mutual aid group, and obtain a corresponding winner list, a process-winners-component 436 that should first return the user a search page for the user to find the expected mutual aid group after receiving the user's request, and then retrieve all the winners of the user's expected group from the database and return the webpage containing the winner list to the user, a claim-prize-component 437 by which a winner can claim the won prize by completing a claim form and submitting the form, a process-claim-component 438 that should send the claim form to the winner in response to the winner's request and, after receiving the claim form, if the claim form is completed correctly, transfer the information on the winner to the system of the financial institution for processing the claim according to the rules of the campaign, and then store the claim data.

Operation of the Present System and Method:

The following section will detail the operation of the present system and method and how the above components perform their functions. In the present embodiment, the administrator of the system creates various mutual aid groups and releases them to the server system from the administrative interface, or examines a self-custom mutual aid group initiated by an initiator and approves the qualified self-custom group. Thus those released and approved mutual aid groups come to the grouping stage. Once the mutual aid group, whether created by the administrator or initiated by the initiator, reaches the grouping stage, it starts its great trip under the control of the present system. The following description will answer the questions listed below, please refer to FIG. 4 that illustrates the routine of running the present system and method:

1. How to create and release a mutual aid group?
2. How to register?
3. How to initiate a self-custom mutual aid group?
4. How to send a request for joining a mutual aid group?
5. How to choose a grouping mutual aid group?
6. How to add a subscription to the shopping cart?
7. How to check out?
8. How to download passcodes?
9. How to transform the stage of a mutual aid group from the grouping stage to the campaigning stage?
10. How to send a request for entering a campaign?
11. How to choose a campaigning mutual aid group?
12. How to enter a campaign under different conditions?
13. How to play by shaking a mobile device like a smartphone?
14. How to randomly retrieve test questions from the test question bank to form a test page?
15. How to enter a campaign from a sponsor's website?
16. How to close a promotional campaign?
17. How to contribute a test question or a puzzle?
18. How to comment and rate a contribution? How to upgrade a good contribution?
19. How to post a creative project? How to fund the best of the projects?
20. How to prevent a staff from defrauding of a prize?
21. How to review a user's history? How to amend a subscription?
22. How to select a winner? How to query winners?
23. How to claim a prize?
24. How to find a business?
25. How to perform management tasks?

1. How to Create and Release a Mutual Aid Group?

Like all things, every mutual aid group has its specific attributes serving the function of the present system, and each mutual aid group has its own characteristics due to the different values of the attributes. Generally, the attributes of the mutual aid group include:

Group ID—a unique identifier of a mutual aid group,
Type—the type of the campaign run by a mutual aid group, either a sweepstake or a contest, and also is seen as the type of the mutual aid group,
Prize—the amount of prize and its categories,
Total Share—the total number of share that a mutual aid group plans to issue,
Cost per Share—the total amount of prize is divided by the total share,
Subscribed Share—the number of shares having been sold,
Available Share—the number of shares being still available for subscribing,
Stage—every mutual aid group must go through three stages in its lifetime: grouping, campaigning, and closed stages,
Prohibited Area—the area where the campaign is prohibited,
Qualification—requirement for joining that a recruit must meet,
Rule of Drawing Winning Numbers—how to draw winning numbers and to pick lucky numbers,
Odds of Winning—depending on the rule of drawing winning numbers,
Passcode—a permit for entering a campaign, this value indicates whether a passcode is required,
Ratio of Passcode to Share—the number of passcodes per share,
Duration of Campaign—the length of time that the campaign lasts,
Start Time—the time the campaign starts,
End Time—the time the campaign closes,
Winning Numbers—the numbers capable of winning the prize, and drawn by the system after the campaign ends.

The administrator creates a mutual aid group by assigning a value to each attribute of the mutual aid group. The administrator can create different mutual aid groups by assigning different values to the same attribute. This enables the administrator to create various mutual aid groups. At least one attribute varies in value between two different mutual aid groups. The variety of mutual aid group is to adequately meet the diverse business's demands. The most important feature of the mutual aid group is that the prize cost of the group is always divided into the certain number of shares so that every business joining the group can afford. To meet different demands the prize cost is usually divided in different ways. For example, one mutual aid group can issue a total of 100 shares and offer a million as the prize, but another mutual aid group likely issue 50 shares and offer the prize of 100 thousand. So, the cost per share varies: The cost of the former is 10 thousand, and the cost of the letter is only 2 thousand. If a sponsor can bear a higher cost, it may choose the mutual aid group offering the bigger prize because the bigger prize has more appeal. The mutual aid group may be classified under two types based on the type of the campaign run by the mutual aid group, i.e. a sweepstake-type and a contest-type. To comply with the laws and rules a sponsor may choose a sweepstake-type of group if it wants only to increase traffic without requiring any purchase, or a contest-type of group if it wants sale growth. In addition, the duration of the campaign usually is also different, and it can last for one month or one year. A player may choose a group having a shorter lifetime if the player is not ready to wait longer for a result. It indicates that the variety of group can not only meet the needs of the businesses, but also provide the player with a variety of selection. For more instances, a player may choose a sweepstake-type of mutual aid group if the player is ready to pay nothing for it, or choose a mutual aid group offering a higher prize if the player dreams of becoming a millionaire.

As stated above, the mutual aid group is to be created by assigning a value to each attribute, but the time of assigning the values is different. Some of them are assigned at the birth of the mutual aid group and keep unchangeable in the whole lifetime of the mutual aid group, such as "group ID", "prize", "type" and "total share", etc.; Some are also assigned at the birth of the group, but the values will change in the progress of the mutual aid group, such as "stage", "subscribed share" and "available share"; The other values are not assigned at the beginning, and they are given at a certain point of the lifetime of the group, such as the "start time" and "end time" of promotional campaign, etc.

To create a mutual aid group the administrator must send a request for creating to the server by clicking the "create a group" button on the administrative interface. In response to the administrator's request, create-MAG-component 400 of the server system will return a creation form to the administrator. There are some blank fields being susceptible to electronic entries on the creation form, and the blank fields are used to input the attribute values of the mutual aid group when creating the mutual aid group, referring to FIG. 5. After completing the creation form the administrator should submit the creation form to the server by clicking on the "submit" button. Component 400 will automatically check the form. If all the required fields have the proper values, Component 400 should store the created mutual aid group with its attribute values and the creating time in the MAG pool data table used for storing info on the mutual aid group. The MAG pool data table has some columns that are used to store the corresponding attribute values of the mutual aid group. The system maps the attributes of the mutual aid group to the columns of the MAG pool data table, that is to say, every attribute has a corresponding column with the same name in the MAG data table, for example, the "group ID" attribute of a mutual aid group corresponds to the "group ID" column of the table.

Among the attributes, "group ID", "type", "prize", "total share" and "cost per share" etc. are straightforward, and each of them is a constant. The administrator just chooses a proper value based on the market need and put it into a related field. That is okay. Other attributes such as the "passcode", the "stage", the "qualification", and the "Rule of Drawing Winning Numbers", etc. will be explained as follows:

A passcode is a permit to enter the campaign. Since a business isn't allowed to require players to make any purchase or do any other substantial thing when running the sweepstake, generally, the passcode is unnecessary for the sweepstake. However, some businesses still want the passcode when running the sweepstake because they hope to increase traffic by the players visiting their websites for the passcode. Some brick and mortar stores with no their own websites can also want the passcode in the same hope of visiting or calling them for free getting the passcode. However, the laws don't prohibit purchase when running the contest, so an organizer of the contest usually requires the entrants to have the passcode as certification of the purchase. This shows the meaning of the passcode is different for the contest and for the sweepstake. For the contest, every passcode must be unique, and no two passcodes are the same in the same group, and the passcode can be used only once or used repeatedly but only by the same player for the same unfinished game. The number of passcode a sponsor can earn depends on the ratio of passcode to share and the number of share for which the sponsor has subscribed. When a contest-type of group is created, the ratio of passcode to share must be set, say, ten thousand passcodes per share. When a sponsor joins a contest-type of mutual aid group by subscribing for the share of the group, the sponsor can receives the passcodes equivalent to its share, and then it gives away the passcodes to its customers, referring to dashed box 601 of FIG. 6. Unlike the contest, if a sweepstake-type of mutual aid group requires the passcode, the group has only one common passcode, or each sponsor of the group individually has its own single passcode, that is, the passcode for the sweepstake may be used commonly and repeatedly. The present system allows the sponsor to set its own passcode, and this will give the sponsor a chance to promote itself by setting the passcode, say, using its business name or its business phone number as the passcode, but the sponsor must submit its passcode to the server as the criterion for checking the user's passcode. In order to prevent the abuse of the passcode some sponsors running a sweepstake can also hope to have as many passcodes as running a contest. It should be feasible technically, but the sponsors can't require a player to pay, purchase or do anything substantial for getting a passcode. The present invention doesn't propose it, but prefers to prevent the abuse of the passcode by restricting the player's playing through the same sponsor (or through the same IP address) to only once or other measures.

The "passcode" attribute is used to indicate whether a passcode is required to enter a campaign. Only two values, "yes" and "no", may be selected for the "passcode" attribute. The value "yes" indicates that a passcode is required, and "no" means no passcode is required. If the value of this attribute is "yes" and the group is of the contest-type, a "ratio of passcode to share" input field will appear on the creation form, referring to FIG. 5. The administrator must set a value for it, say, ten thousand passcodes per share or thousand passcodes a share, etc. depending on the size of the mutual aid group. About how to set the passcode-related values, refer to Dashed Box 602 of FIG. 6. If the value of the "passcode" attribute is the same "yes", but the "sweepstake" is checked in the "type" field on the creation form, the "ratio of passcode to share" field hides, instead, a "common passcode" field will appear. The administrator must set the common passcode for the sweepstake-type of group. The present system allows the sponsors to set their own passcode on the application form for joining if any of the sponsors don't like the official common passcode, referring to Dashed Box 603 of FIG. 6 and step 6 for details. When create-MAG-component 400 receives the creation form, if it detects the value "yes" in the passcode field and the value "contest" in the "type" field it will calculate the total number of passcodes of the group from the two values of the "ratio of passcode to share" and the "total share" attributes, and then trigger the passcode generator of the system to generate this number of passcodes and stores these passcodes into the passcode data table of the database, referring Dashed Box 604 of FIG. 6. The ratio is also used to calculate the number of passcodes each sponsor earns, referring to step 8 for details. Each passcode occupies one row individually in the passcode data table, and component 400 should assign a value, i.e. the ID of this group, to the "group ID" column of the passcode data table for every passcode. This is to declare that these passcodes are to be owned by this mutual aid group so that the system can query the passcodes of this group when needed. If component 400 detects the value "yes" in the passcode field and the value "sweepstake" in the "type" field the passcode generator will not be triggered and create-MAG-component 400 should store the common passcode. If the value of the "passcode" attribute is "no" the passcode generator doesn't also be triggered regardless of the type of the mutual aid group, and under this condition there is no need to set the common passcode.

The "stage" attribute indicates the stage at which a mutual aid group is living. Its value is a variable. Every mutual aid group will go through three developmental stages in its lifetime: grouping, campaigning, and closed stages. The conditions of the transformation of the stage and the change of the value of the "stage" attribute are reflected in FIG. 7. The "stage" attribute has an additional value "initiating" applying only to a self-custom mutual aid group, referring to step 3 below. The grouping stage is a preparatory stage at which the mutual aid group need raise enough money by recruiting sponsors to subscribe for the share of the mutual aid group. The campaigning stage is a stage of running a promotional campaign (either a sweepstake or a contest). The promotional campaign does not start until the campaigning stage. The closed stage means that the promotional campaign has ended, and users can query winners or view the records of the closed mutual aid group at this stage. When creating a mutual aid group by setting the values of all necessary attributes, the value of the "stage" attribute must be set as the "grouping". If the value of this attribute isn't the "grouping", create-MAG-component 400 will reject it. Generally, the "grouping" as a default value has been put in the "stage" attribute field on the creation form and is irremovable and un-modifiable. Certainly, there also may not be the "stage" field at all on the creation form. Instead, component 400 automatically puts the default "grouping" in the "stage" column of the MAG pool data table when storing the created mutual aid group. If a created mutual aid group is released, this means the mutual aid group has reached its grouping stage. That is the mutual aid group has become a grouping mutual aid group. The "stage" attribute is also used as a retrieval condition of retrieving mutual aid groups. For example, to retrieve the grouping mutual aid groups, the retrieval condition must be that the "stage" attribute value is the "grouping", and to retrieve the campaigning groups the value must be the "campaigning".

The "qualification" attribute indicates certain requirements for recruitment. This refers basically to the business classification and the business's locality. The present system gives the administrator and the initiator some options of the qualification on the creation form and the initiation form so that they can select one from the given some options. For example, the "locality-restriction" options can be: "restrict recruit to only one each city", or "restrict recruit to only two each zip code", or "unlimited", etc. "business-classification-restriction" options can include: "recruit only food sellers", or "only office supplies", or "only medical institutes", or "only travel & hotels", or "any classification but being necessarily different from the business classification of existing sponsor", or "unlimited", etc. referring to step 6 and FIG. 5 for details.

The "rule of drawing winning numbers" attribute tells users how to pick lucky numbers. For example, pick 5 numbers from 1 to 20, or pick 4 numbers from 1 to 10. This determines the odds of winning. The present system draws winning numbers is just based on the rule. The system gives the "rule of drawing winning numbers" options on the creation form and the initiation form for the administrator and the initiator to select, referring to FIG. 5. A user picking the lucky numbers must also conform to the rule of drawing winning numbers, or the lucky numbers will become invalid, referring to step 12.

The "subscribed share" attribute and the "available share" attribute reflect changes of the shares of the mutual aid group in the grouping process, and they both are variable. The initial value of the "subscribed share" attribute is the default "0", and the initial value of the "available share" attribute must be equal to the total share at the birth of the group. The two attributes and their change will further be explained in step 9. In addition, the "start time" and the "end time" attributes should be a blank in value at the beginning of the group, and their values are not assigned until the stage of the group is changed from the grouping stage to the campaigning stage, referring to step 9.

2. How to Register?

Like all the Internet services, a user is also required first to register to use the system, and the registration procedure is similar to that of the general Internet services. The user is required to create a user ID and a password and to provide the necessary information about the user, referring to FIG. 8. This doesn't seem to be special. However, because the present system and method involves to the sweepstake, but the laws and regulations prohibit anyone being under the legal age from playing, moreover, the contest and the sweepstake is to be prohibited in certain areas, the system encourages the user to give his/her age and address when registering, and it is particularly emphasized that the age and the address are required to be real when registering as a player, or the player must declare that he is over the legal age and he doesn't live in the prohibited area. The user should submit the registration form to the server through user-registration-component 401, and process-registration-component 402 of the server system will store the user's registration information into a data table being used to store the user's registration information in the database. When a registered user logs in to intend to access the system, the system will check the user's age and address. If the user is under legal age or just lives in the area there the prize promotion is prohibited the user will be declined to play, referring to step 10, but the user is allowed to do something else, such as contributing a test question, referring to step 17 below.

3. How to Initiate a Self-Custom Mutual Aid Group?

Besides the administrator, the present system and method allows a business as an initiator to initiate a self-custom mutual aid group (SMAG). The so-called self-custom mutual aid group is such a mutual aid group that is created and initiated by a business according to its own demand instead of an administrator. Initiating a self-custom mutual aid group is similar to the administrator creating an official mutual aid group but adding a payment procedure and a necessary obligation of buying shares. Like the mutual aid group created by the official, the self-custom mutual aid group should also have the same kinds of attribute. The difference is that the attribute values of the self-custom mutual aid group are usually fixed by the initiator rather than by the administrator. Allowing the business to initiate the self-custom group just is to try to satisfy the special demands of some businesses.

Figures 10, 11:
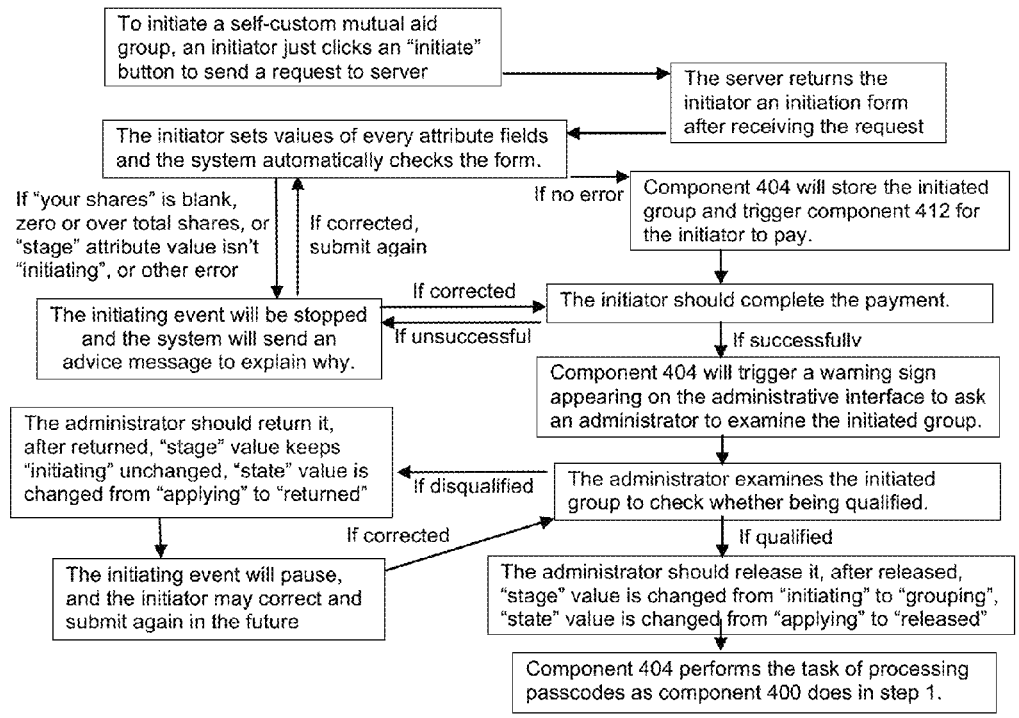
FIG. 10 is a flow diagram illustrating the process flow of initiating a self-custom mutual aid group, referring to drawing 8/22.
FIG. 11 is a diagram showing a sample webpage containing all the mutual aid groups being at the grouping stage for a potential sponsor to choose, referring to drawing 8/22.

An initiator wants to initiate a self-custom mutual aid group, very simply, just clicks the "Initiate" button on a webpage. Initiate-SMAG-component 403 of the client side will respond to the initiator's click by the browser sending a request to the server side via the communication network, and process-initiation-component 404 of the server side will retrieve the information about the initiator and its business in the registration data table of the database after receiving the request, and then return the initiator a webpage containing an initiation form, and the form has the same blank attribute fields as the creation form used in step 1, referring to FIG. 9. The retrieved information about the initiator and its business should have been put on the initiation form. The initiator should first check the information about the initiator and its business, if any error occurred, the initiator has to correct; if the information is correct, the initiator should input his expected values into the attribute fields to initiate the self-custom mutual aid group. The system will automatically assign an application number to the initiation form, and the initiator should keep the number for its record so that it can query, review or amend the self-custom group initiated by it in the future. About the business processes of the initiation event, please continue to read and refer to FIG. 10.

Unlike the creation form, a new additional input field named "your share" is added to the initiation form. There isn't the field on the creation form. The "your share" field is used to fix the number of share for which the initiator subscribes. The "your share" isn't an inherent attribute of the mutual aid group, but an obligation the initiator must fulfill. That is, an initiator must first subscribe for the certain number of share of the self-custom mutual aid group being initiated by himself, in other words, the value of the "your share" field can't be zero or blank when initiating. So, the "your share" is also seen as a start-up share herein. If the initiator fails to subscribe for the start-up share, the system will reject the application for initiating a group. A valid value of the "your share" will result in the change of the "subscribed share" attribute and the "available share" attribute in value. In step 9 below this will be discussed.

Another difference from creating a mutual aid group is about the "stage" attribute field. The value of the "stage" attribute field is the default "grouping" as the administrator releases a mutual aid group in step 1, but this attribute value must be "initiating" when initiating, because an initiator isn't allowed to directly release a group, instead, it can only submit its application for initiating a self-custom mutual aid group to the administrator of the system, in other words, the self-custom mutual aid group can't directly go to the grouping stage before it is examined and approved by the administrator.

If the initiator has a circle of friends and likes to invite the friends to join the self-custom mutual aid group, he may use the email function provided by the system. In this embodiment, the initiator should check the "invite friends" option, referring to FIG. 9, and once the option is checked, a table is spread beneath the option for the initiator to give the email addresses of the friends. If process-initiation-component 404 detects the option is checked, it should start the email function to send out the email of invitation to the friends after the initiation event is completed successfully. The present system has prepared the formatted email that introduces the friends to this initiating event, and put into the email a handy "join" link leading the friends to the present system, and then the friends can get a page for joining the self-custom mutual aid group, referring to step 6 for how to join.

There is a certain limitation on the value of some attribute fields of the initiation form. For example, all of the attribute fields can't be blank, and the value of the "your share" field can't be zero or more than the total share. The value of the "stage" attribute field must be the default "initiating". The system will automatically check the initiation form. If any error occurs initiate-CMAG-component 403 cannot submit the form, instead it will give the initiator advice on correcting error, referring to FIG. 10. Once the initiation form is received, process-initiation-component 404 will store the self-custom mutual aid group with all its attributes into the MAG pool data table and trigger process-payment-component 412 to return a payment page to the initiator for paying. The detail about the payment will be discussed in step 7. If the feedback from component 412 indicates a successful payment, it will result in a warning sign appearing on the screen of the administrative interface to ask an administrator to examine whether the initiated group conforms to the laws and the rules of the campaign. Clicking the warning sign will open a list of all the self-custom groups waiting for the examination on the administrative interface. Clicking one of the listings will open its original initiation form, but on the initiation form the original "initiate" button is replaced by a new "release" button, and the "reset" button is replaced by a "return" button. The administrator should examine the initiated self-custom group to check whether it is qualified. If the initiated self-custom group complies with the laws and the rules, the examiner should click the "release" button. The clicking action will trigger process-initiation-component 404 to transform the stage of the initiated self-custom mutual aid group into the grouping stage by changing the value of the "stage" column from the default "initiating" to the "grouping" in the MAG pool data table. The self-custom mutual aid group isn't released until the stage value is changed. If there is any violation of the laws and the rules, the administrator should click on the "return" button to return the original initiation form for the initiator to correct. In this case, the default value "initiating" of the "stage" column doesn't be changed. If the initiator has corrected and submits again, component 404 will again require the administrator to reexamine whether it is qualified, and then repeat the subsequent tasks; if the initiator doesn't temporarily correct, the initiating process will pause, but the initiator may login his/her account at any time in the future to correct by clicking the value of the initiating state on the account page. If the feedback from component 412 indicates a failure payment, the initiating event will pause. The initiator may correct to restart the payment. The information about the initiator initiating the self-custom mutual aid group is stored in the subscription data table. There is an initiating state column in the table. About the initiating state there are four possible values: "applying", "released", "returned", and "canceled". The "applying" means an application for initiating has been filed but isn't approved; the "released" means the initiated self-custom mutual aid group has been approved and thus is released; the "returned" means the application for initiating has been returned but hasn't been submitted yet again. Whether released or returned, the listing must disappear from the list, but the warning sign does not disappear until every listing has been processed. Once the value of the "stage" column in the data table is changed to the "grouping" from the "initiating", component 404 will perform the task of processing passcodes as component 400 does in step 1. The "canceled" state likely occurs when the initiator amends the initiation, referring to step 21. In addition, there are two special fields of "set-your-question" and "set-your-passcode" on the initiation form, and these will further be discussed in step 6.

4. How to Send a Request for Joining a Mutual Aid Group?

Once a mutual aid group is released, whether created by an administrator or initiated by an initiator, the mutual aid group comes to the grouping stage. As long as the mutual aid group is at the grouping stage, any business (as an applicant) being interested in the mutual aid group may respond to the recruitment by applying for joining the mutual aid group to share a prize promotion if the business is ready to share in the cost of the prize promotion. In order to join a grouping mutual aid group the applicant just clicks the "join" button on a webpage, in response to the clicking action being performed, request-joining-component 405 of the client system will send a request to the server through the browser via the communication networks. After receiving the request, process-joining-component 406 of the server side will retrieve all the mutual aid groups being at the "grouping" stage from the MAG pool data table, and then create a GMAG page containing all the grouping mutual aid groups and return the page for the applicant to choose a preferable group.

5. How to Choose a Grouping Mutual Aid Group?

The client system receives the GMAG page and displays the page in the browser. The grouping mutual aid group may be represented on the page in various forms, such as a text box, a listing of a list, an image, etc. Herein it is represented in the form of a text box, referring to FIG. 11. The arranged order can be random, and they can also be arranged in order of the amount of prize or in order of the priority of the release and so on. An applicant can view all the grouping mutual aid groups and choose preferred one from among the grouping mutual aid groups by clicking the preferred group. In response to the clicking action being performed, choose-GMAG-component 407 of the client side submits the applicant's choice to the server by the browser via the communication networks, and process-GMAG-component 408 of the server side will retrieve the information on the chosen group including its important attribute values from the MAG pool data table, particularly the value of the "available share" attribute, then component 408 will create and return an application form for the applicant to apply. The information about the chosen group and its attribute values should have been placed on the application form and are unchangeable. When creating the application form, the system will automatically assigns an application number to the application form, and the applicant should keep the number for its record so that it can easily query, review, or amend the application in the future. In addition, the application form has an apparent warning words saying that the value of the "your share" field can't be blank, zero or more than the value of the "available share" attribute.

6. How to Add a Subscription to the Shopping Cart?

The client system receives the application form for joining and displays the form in the browser, referring FIG. 12. The applicant should check the information on the chosen mutual aid group on the form to make sure that the mutual aid group shown on the form is just that group chosen by the applicant before completing the form. The business process for joining a mutual aid group is reflected in FIG. 13. Like the initiation form, the application form for joining has also many fields being susceptible to electronic entries. The applicant is required to fill in the fields with necessary information on the applicant, such as its business name and officer's name, the business classification, the number of employee, Employer Identification Number, street address, city, state, zip, phone number, website and email, etc. If the applicant had provided the information when registering, the information should have been put in the related fields, but the applicant need still check them to make sure the information is right. Maybe an applicant wants to know the members having before joined the group for certain of reasons. For example, the applicant wants likely to check whether the locality of any existing member is too close to its locality. To help the applicant to decide whether to join the mutual aid group the present system adds a "check members" button on the application form. If the applicant clicks on the "check members" button, process-application-component 410 will retrieve the information about those members having joined the group from the subscription data table in response to the clicking action, and then return the information to the applicant. Three other attribute fields: a "your share" field, a "set-your-question" field and a "set-your-passcode" field will specially be discussed as follows:

As stated in the preceding sections, the initiation form has the "your share" field used for an initiator to fix the number of start-up share. Similarly, the application form has also the same "your share" field as the initiation form. The applicant must first determine the number of share for which the applicant intends to subscribe and place the number into the "your share" field. The present system will calculate the amount of prize and the service charge that the applicant should share from the number of "your share" and the value of the "cost per share" attribute, and then show the results on the application form to that the applicant can check. If the applicant successfully joined finally, the valid value of the "your share" field must result in the corresponding changes of the "subscribed share" and the "available share" attributes in value, referring to step 9 below.

If the chosen mutual aid group is of the contest-type, process-GMAG-component 408 will add a checkbox of "set-your-question" on the application form when creating the form. If the applicant checks the box, a set of fields is spread beneath the box. Using these fields, the applicant may make up one question about its own business to advertise its business. The set of fields includes a question field, several fields of the possible answer option, and a correct answer field. Once the checkbox is checked, any of the fields isn't allowed to be blank. If the applicant isn't like to set any question about itself, it shouldn't check the box. The values of the fields should be stored into the question bank. The category of question made up by the sponsor is classified to a special "by-sponsor" category, and the "by-sponsor" category of test question will also be retrieved to form a test page, for details referring to step 14.

If the chosen mutual aid group is of the sweepstake-type and the "passcode" attribute value is "yes", process-GMAG-component 408 will add a checkbox of "set-your-passcode" on the application form when creating the form. If the applicant checks the box, a field of setting passcode will appear by the box. Using the field, the applicant can set his own passcode. The applicant may use his business name or phone number etc. as the passcode. If the applicant checks the box but places nothing in the field finally, or the applicant doesn't check the box, component 410 will use the common passcode of the group as the passcode of the applicant.

If the chosen mutual aid group is of the sweepstake-type but no passcode is required, there is no "set-your-passcode" field on the application form, and thus the applicant needn't set it.

There are three buttons at the bottom of the application form: an "add to cart" button, a "join now" button and a "reset" button. The function of the "add to cart" button is different from that of the "join now" button, but clicking whichever of the two will trigger the system to check the application form, e.g., check whether any of the fields is blank or whether the value of the "your share" field is zero. If any error occurred, the system will give advice on how to correct the error. If an applicant clicks the "join now" button to submit the application, this means the applicant is to subscribe formally. Make-application-component 409 of the client side will send a request to the server system through the browser in response to the clicking action being performed. After receiving the application process-application-component 410 of the server side will examine the application. The examination relates mainly to the business locality of the applicant, the business classification and its passcode. Process-application-component 410 has locality-checking, business-classification-checking and passcode-checking functions. At this time one or several of the functions can be activated based on the different conditions. If one of the locality-restriction options of the "qualification" of the chosen mutual aid group is selected, referring to step 1, the locality-checking function is activated to check the applicant's locality and to compare the applicant's locality with that of the existing sponsors of the chosen group based on the rule of the locality-restriction option. Generally, a sponsor doesn't like to see any of its neighbors run the same promotion at the same time because that will poach its customers and thus eat into the effect of its promotion. Supposing the option is to restrict the recruit to only one each city, component 410 will query the database to find whether the city which the applicant is in has existed in the record of this group using the name of the city and the group ID as the querying conditions. If no recode is found, that is ok; if the same city has existed in the record, even only one, the application will be declined. Similarly, if one of the business-classification-restriction options of the mutual aid group is selected, the business-classification-checking function is activated to check whether the business classification of the applicant satisfies the requirement for this restriction. The business classification is generally represented by a code to process easy. Component 410 will query the selected option of the business-classification-restriction of the mutual aid group and compare the option with the applicant's business classification, i.e. the value of the "business classification" field of the application form. If the applicant's business classification can satisfy the requirement for the business-classification-restriction, the application will be welcome, or the application will be declined. Another checked item is about the passcode. If the applicant sets its own passcode, component 410 should check whether the same passcode has existed in this group. If existed, the applicant will be required to reset its passcode or to use the common passcode of the chosen mutual aid group. In short, component 410 takes charge of the examination. If any of the errors occurred, component 410 will send the applicant message 409s to explain why. If everything is okay, process-application-component 410 will store the application information in the subscription table and trigger process-payment-component 412 to start the procedure of the payment.

The subscription data table has a "joining state" column. The column is used to record the state of joining a mutual aid group. There are three possible states: "applying", "accepted" and "canceled". The "applying" state means that the applicant has submitted its application form but hasn't paid or the application hasn't been approved. The "accepted" state means that the applicant has paid and become a formal member of the mutual aid group. The "canceled" state means the applicant has canceled its subscription. In the present step, component 410 should put the value "applying" in the "joining state" column when storing the information on the application because the applicant hasn't paid up to this step.

If the applicant clicks the "add to cart" button to submit the application, it means that it hasn't subscribed formally yet. The data of its subscription should temporarily be stored into the shopping cart of the present system for a certain period of time. In this case, all the above checking functions of component 410 are not activated, and also component 412 will not be triggered. By clicking the "my cart" within the certain time, the applicant can review or amend its subscription. The shopping cart has a "checkout" button. The function of the button is the same as the "join now" button. Clicking the "checkout" button means the applicant subscribes formally, and this will trigger all the above functions and process-payment-component 412.

7. How to Check Out?

The triggered component 412 will send a payment page to the client system for the initiator or the applicant to make a payment. The client side receives the payment page and displays it in the browser, referring to FIG. 14. If the initiator or the applicant is ready to pay for initiating or joining the mutual aid group, it has to select a preferable payment method. Many popular payment methods may be adopted, such as paying with a credit or debit card, mailing a check, or specifying a checking account for a direct withdrawal, and so on. These methods and the implementation of the methods are usual, and there is no need to discuss herein, but what needs be explained is how the payment affects other businesses of the present system. Generally, processing the payment has the four states: an "outstanding" state, a "processing" state, a "paid" state, and a "canceled" state. The "outstanding" state means the payable cost has not paid yet. The "processing" state means the initiator or the applicant has submitted its payment form, and the payment is being processed but hasn't finished. The "paid" means the financial department has received the payment. The "canceled" state means the initiator or the applicant has canceled its previous subscription. The value of the "payment state" column of the payment data table will affect the following business processes.

The payment form inherits the important information about the chosen group and the user (either the applicant or the initiator) from the application form, particularly the number of shares and the amount of payment. The initiator or the applicant should check the data and correct possible errors, and then provide the information about its account for the payment and the bill information on the payment form. If everything is OK, the initiator or the applicant should click the "pay" button after completing the payment form. In response to the clicking on the "pay" button, make-payment-component 411 will submit the payment form to the server system, and process-payment-component 412 of the server system will transfer the payment information to the processing system of a financial institute by a payment gateway between the two systems for processing the payment. Process-payment-component 412 will store the payment information in the payment table and assign the value "processing" in the "payment state" column of the payment data table because the payment is being processed but hasn't finished yet.

Process-payment-component 412 listens to the feedback from the financial institute, and the value of the feedback from the financial institute is put in the "feedback" column of the payment data table. If the value of the feedback shows a successful payment, component 412 will immediately change the value of the "payment state" column from the "processing" to the "paid" for the user. This means that the initiator or the applicant has finished its payment. If the value of the feedback shows a failed payment, the system will decline and give the user a message to explain why, and the value "processing" of the "payment state" column will keep unchangeable. A successful payment will set off the following chain reaction.

Process-application-component 410 mentioned in step 6 above has been monitoring the value of the "payment state" column of the payment data table. If it detects the change of the value of the "payment state" column, that is, if it detects the value "paid" in the "payment state" column, it will change the value of the "joining state" column of the subscription data table from "applying" to "accepted" if the applicant is for joining. When the "joining state" is the "accepted" the applicant becomes a formal member of the mutual aid group. However, for the initiator the value "paid" will result in a warning sign appearing on the administrative interface to ask an administrator to examine, referring to step 3 above.

Figure 13:
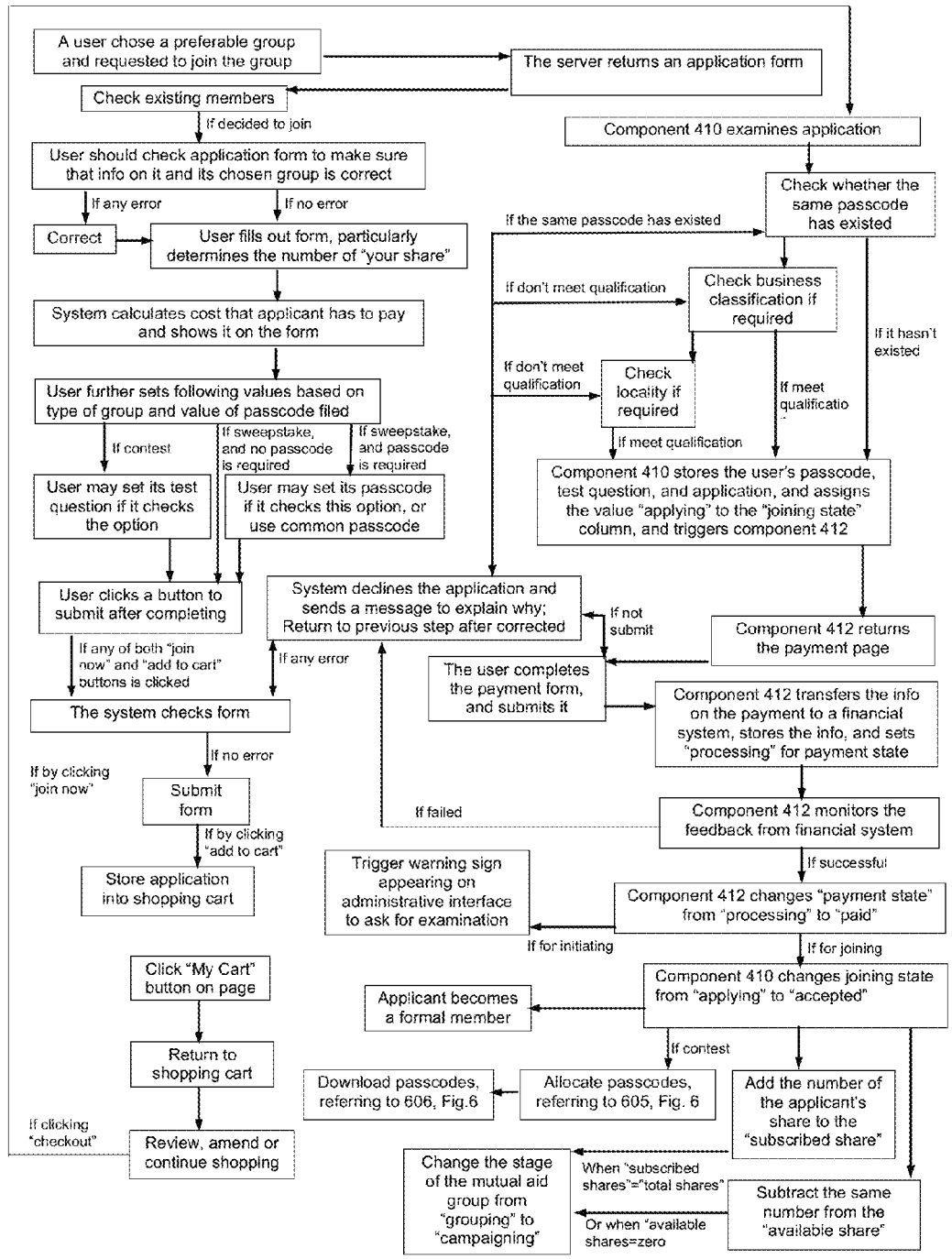
FIG. 13 is a flow diagram illustrating the process flow of joining a mutual aid group and paying for joining or initiating, referring to drawing 10/22.

Process-payment-component 412 will also update the values of both the "subscribed share" and the "available share" attributes of the chosen group in the MAG pool data table because they have changed owing to the new member's participation, for details, referring to step 9 and FIG. 13.

Process-payment-component 412 can also query the value of the "passcode" column of the MAG pool data table of the database. If the "passcode" column value of the chosen group is "yes", component 412 will trigger process-passcode-component 414 to continue the subsequent routine of downloading passcodes in step 8. If the value is "no", component 414 isn't triggered, the system will skip step 8 and go to step 9 to continue the routine. Finally, process-payment-component 412 will send the message 413 to inform the user whether the application for joining or initiating has got success.

If the applicant canceled its subscription later, the value of the "joining state" column of the subscription data table will be changed from the "accepted" to the "canceled", and thus the value of the "payment state" column of the payment data table will also be changed from the "paid" to the "canceled", referring to step 21 for details. In the foregoing processes, any error can stop the course of joining and the payment. If the applicant corrects and submits again, the system will return to previous step to continue, referring to the lines with arrows at two ends in FIG. 13.

8. How to Download Passcodes?

Figure 6:
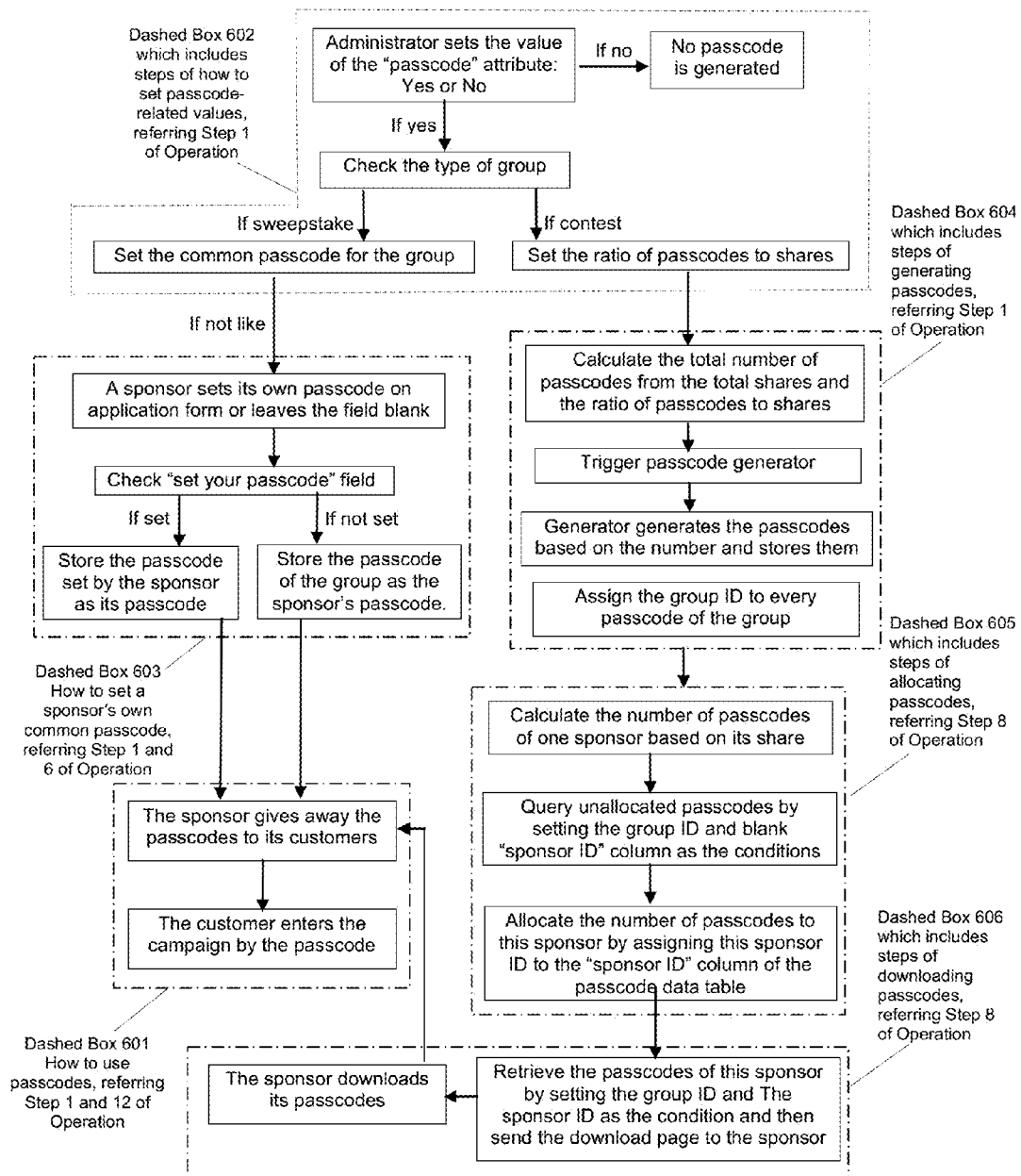
FIG. 6 is a block diagram illustrating the process flow of generating, and allocating, and downloading, and using passcodes, referring to drawing 5/22.

As mentioned in step 1, the passcodes have been generated when releasing a mutual aid group and stored in the passcode data table of the database if the mutual aid group needs the passcodes, referring to FIG. 6. Process-passcode-component 414 of the server system will calculate the number of passcode the applicant or the initiator got from the ratio of passcodes to shares and the number of their share, and the number of passcode should be the product of the two values. Next process-passcode-component 414 should find out those unallocated passcodes of the chosen group in the passcode data table using the ID of the chosen group and the "sponsor ID" column being blank as the search conditions (if the "sponsor ID" column has a value, that indicates the passcode has been allocated to a certain sponsor), then take the number of passcodes out of the search result, and allocate the passcodes to the applicant or the initiator by assigning their "sponsor ID" to the "sponsor ID" column of the passcode data table, referring to Dashed Box 605 of FIG. 6. Next, if the applicant or the initiator requests to print or to download their passcodes at any time in the future, referring to Dashed Box 606 of FIG. 6, component 414 will retrieve all the passcodes of the sponsor from the passcode data table using the group ID and the sponsor ID as the search condition to form a passcode page, and then return the passcode page with a "download" button and a "print" button to the user. Download-passcode-component 415 of the client side gets the passcode page and displays it in the browser. The applicant or the initiator can download, save, or print the passcodes using this passcode page. The download time is recorded into the "download time" column of the passcode data table. Process-passcode-component 414 and download-passcode-component 415 don't be activated if no passcode is required.

9. How to Transform the Stage of a Mutual Aid Group from the Grouping Stage to the Campaigning Stage?

The business processes of grouping the businesses together by recruiting the sponsor to the mutual aid group were described above. At the grouping stage far more applicants will join the mutual aid group following the same procedure one after another until all the shares of the group are sold. As mentioned in step 1, in the process of grouping, with the applicants joining successively, the values of some attributes of the mutual aid group will change step by step. For example, the number of share for which an applicant subscribed every time will be added to the "subscribed share" one by one, that is to say, the value of the "subscribed share" will progressively increase to up to the total share of the group, while the equal number will be subtracted in the same way from the "available share", and that will progressively decrease to up to zero. This reveals that both the "subscribed share" and the "available share" are a pair of dynamic attributes and change in the opposite direction. Looking back, in step 7, process-application-component 410 changes the value of the "joining state" column of the subscription data table following the change of the value of the "payment state" of the payment data table. Once the value of the "joining state" of the subscription data table becomes the "accepted", component 410 will trigger math operations to add the number of applicant's share to the existing value of the "subscribed share" column of the MAG pool data table and to subtract the equal number from the existing value of the "available share" column. After completing the operations, component 410 will separately transmit the results of the operations to the two corresponding columns to update their values, referring to FIG. 13.

Every successful subscription is bound to cause the change of the above two attributes in value, bud the total share of the group is predetermined and keep the value unchangeable in the process of grouping. When the accumulative number of subscribed share reaches the total share, the value of the available share must synchronously become zero. Change-stage-component 416 of the server system has been monitoring the change of the values of both the "subscribed share" and the "available share" columns. Once change-stage-component 416 detects the value equal to the total share in the "subscribed share" column or the value being zero in the "available share" column, it immediately transform the stage of the mutual aid group from the grouping stage to the campaigning stage by updating the value of the "stage" column of the MAG pool data table from "grouping" to "campaigning". After this, this group can only be retrieved as a campaigning mutual aid group rather than a grouping group. The changing time will be recode in the "changing time from G to C" column.

Another task of change-stage-component 416 is to set a start time and an end time for the promotional campaign according to the predetermined rule and the "duration of campaign" attribute of the mutual aid group. Supposing the rule is to set the first 0 o'clock after the time when the value of the "stage" is changed to the "campaigning" as the start time, component 416 should store the 0 o'clock and its date into the "start time" column of the MAG pool data table, and calculates the end time of the campaign from both the start time and the value of the "duration of campaign" attribute, then store the result into the "end time" column of the MAG pool data table. Hence the grouping mutual aid group (GMAG) becomes a campaigning mutual aid group (CMAG). This means the mutual aid group has well finished its first stage—the grouping stage, and is going to begin its promotional campaign (either a sweepstake or a contest).

10. How to Send a Request for Entering a Campaign?

When a mutual aid group comes to its campaigning stage, someone, or a player, may enter the campaign run by this group: either a sweepstake or a contest. The player can play by clicking the "play" button on a webpage. In response to the player's clicking action being performed, request-playing-component 417 of the client system will send a request to the server system via the communication networks. After receiving the request process-playing-component 418 of the server system should check the player's age and address, and also check the value of the "prohibited area" column of this campaigning group in the MAG pool data table and compare the player's address with the prohibited area. If the player is under the legal age or doesn't make a required declaration, or/and if the player just lives in the area where the type of promotional campaign is prohibited, the player will be rejected, otherwise, component 418 will retrieve all the mutual aid groups whose value of the "stage" column is the "campaigning" from the MAG pool data table, and then return a CMAG page containing all the campaigning mutual aid groups for the player to choose a preferable one.

11. How to Choose a Campaigning Mutual Aid Group?

The CMAG page is displayed in the browser of the client side. Just like the grouping mutual aid groups, the campaigning mutual aid groups may also be represented in various forms on the webpage. The arranged order is also random like the GMAG page, referring to FIG. 15, and they may also be sorted by some attributes, such as "type", "prize", "duration of campaign" and "end time" etc. Accompanying the group ID of each group, the some important attributes are shown for the player to view. The player can browse the campaigning mutual aid groups and choose a preferable one from among them by clicking that mutual aid group. In response to the player's clicking action, choose-CMAG-component 419 will submit the player's choice to the server system through the browser, and process-CMAG-component 420 of the server side will retrieve all the sponsors within the chosen campaigning group from the subscription data table by setting this group ID as the retrieval condition, then create a sponsor page, and then return the sponsor page with the information about every sponsor, referring to FIG. 16 for the player to choose. The player may play the sweepstake or enter the contest through whichever sponsor of the chosen mutual aid group because the sweepstake or the contest is sponsored jointly by all the sponsors of the group.

12. How to Enter a Campaign Under Different Conditions?

The client system receives the sponsor page and displays it in the browser, referring to FIG. 16. All the sponsors of the chosen mutual aid group are shown here. Just like the mutual aid groups, the sponsors may also be represented in various forms, such as a listing of a list, a text box, an image, a flash, a video, etc. The sponsor's name, telephone and advertisement for its product or service are put here. One skilled in the art would appreciate that a dropdown menu can be used for replacing the above forms, but the dropdown menu can merely contain limited contents. The arranged order of the sponsors is generally random, bud they can also be sorted in the number of sponsor's shares or in order of the subscribing priority and so on. A "shuffle" method is used in this embodiment. Supposing that the text box is used and each share can earn one box, and then, if a sponsor subscribes for two or more shares, it will have two or more boxes to be shown on the page. Since every share of the same mutual aid group bears the same cost of the promotional prize, every box should equitably be displayed on the webpage. Thus, before the server system returns the page containing the sponsors' boxes to the client system each time, the system will randomly rearrange the order of the boxes so that every box can have the equitable opportunity to be shown in a conspicuous position. This is just "Shuffle". If a sponsor wants to have more opportunities to show its box, it just pays more to subscribe for more shares in the same group, so it can get more text boxes. The "shuffle" method differs from an auction method that is usually used in a search engine. The auction method makes higher paying advertisers gain greater position, so the advertiser who places the highest bid is showed at the top of the list, with other advertisers showed below in reverse bid order. Further, if a sponsor prefers to solely bear the whole prize of the mutual aid group, it becomes a sole sponsor, and the mutual aid group becomes exclusive to the sponsor.

A player wants to play, simply, he just chooses a sponsor by clicking it, and the player can enter the campaign via the sponsor. In response to the player's clicking action, choose-sponsor-component 421 will submit the player's choice to the server. In fact, the transmission of the choice will send the information on the sponsor ID, the group ID, the type of the group, and the attribute of the passcode to the server system, and thus process-choice-component 422 of the server system can distinguish the type of the mutual aid group and the campaign (either a sweepstakes or a contest), and confirm whether a passcode is required. Process-choice-component 422 will have different responses to the player's choice under different conditions. There are three possibilities being detailed as follows, referring to FIG. 17.

First:—If the chosen group is of the sweepstake-type and no passcode is required for playing the sweepstake, when a player chose one sponsor, process-choice-component 422 will not check the passcode, but check whether the player had played through the sponsor. In order to provide every sponsor of the chosen group with a fair opportunity of being visited, the rules usually stipulate that a player can play through the same sponsor only once. Following the stipulation, to play the sweepstake of the same group again the player has to play through one of other sponsors of this group. For this reason, process-choice-component 422 needs to query the player's history record in this group using the group ID and the user ID of the player as query conditions, particularly query the value of the "sponsor ID" in the player's records of the player data table before returning a campaign page. If the chosen sponsor's ID doesn't exist in the player's records, it means the player hadn't played through this sponsor, process-choice-component 422 will return the campaign page and require the player to pick and input his/her lucky numbers in designated boxes, referring to FIG. 18. The player must submit the lucky numbers to the server system by clicking the "play" button on the campaign page. In response to the player's click, enter-campaign-component 423 will submit the player's lucky numbers to the server system, and process-campaign-component 424 will check whether the player's lucky numbers conforms to the rule of drawing winning numbers. If yes, separately store the player's user ID, the chosen sponsor's ID, the group ID, the picked lucky numbers and the playing time, etc. into corresponding columns of the player data table as the player's account record after receiving the lucky numbers; If no, give the player a warning message to explain why. If the chosen sponsor's ID has existed in the sponsor's ID column of the player's records, it means the player had played through this sponsor. So component 422 should give the player a warning message of advising him to choose another sponsor instead of the campaign page. The sponsor's ID is just the user ID of the sponsor, or a specific ID assigned by the present system.

Second:—If the chosen mutual aid group is of the sweepstake-type, but a passcode is required for playing the sweepstake, process-choice-component 422 will first return a box to require the player to input the passcode. Component 422 will check whether the passcode is identical with that passcode set by the chosen sponsor or the common passcode assigned by the system by querying the values of the "passcode" column in the passcode data table using the group ID as query condition, referring to step 1 and step 6. If it is identical to one of the two standard passcodes, the player's passcode is valid. Only when the passcode does be valid, component 422 can return a campaign page with several input boxes for the player to input his/her lucky numbers, elsewise, component 422 will give the player a warning message instead of the campaign page. If the player's passcode is valid, the system will perform the same routines as the first possibility described in previous paragraph 0145. The passcode used for the sweepstake may usually be used repeatedly, that is to say, the passcode used by a player once can again be used by the player or other players. The system doesn't record the use state of the passcode generally when running a sweepstake, but the above stipulation that a player can enter a campaign through the same sponsor only once can still apply. If need be, it is possible that a player can play only through that sponsor issuing the passcode.

Third—If the chosen mutual aid group is of the contest-type, a passcode is necessary always. Process-choice-component 422 will return a passcode box for the player to input the passcode. As stated in previous paragraph 0146, process-choice-component 422 will check whether the passcode given by the player is identical with one of the passcodes owned by this mutual aid group by querying the values of the "passcode" column using the ID of this chosen group as a query condition in the passcode table. As long as the player's passcode is identical to one of the values of the "passcode" column of this chosen group (a contest-type of group has a number of passcodes usually), the player's passcode is deemed valid. Since a passcode for entering a contest can be used only once, besides checking the validity of the passcode, the system will further check the use state of the passcode, that is to say, check whether the passcode had already been used. When a passcode is used, the ID of the player who uses the passcode is stores in the "player ID" column of the passcode table. Component 422 must query the value of the "player ID" column using the group ID and this passcode as the query conditions in the passcode data table. If component 422 detects any player's ID in the "player ID" column, it means that the passcode had been used. In this case, even if this passcode is valid, component 422 will give a popup message of saying this passcode has been used. And if the passcode provided by the player is valid, but no player's ID is detected in the "player ID" column, that is to say, its value is blank, process-choice-component 422 will retrieve test questions from the question bank according to the preset rules to create a test page, and then return the test page to the player. The rules can require component 422 to retrieve the test questions and puzzles in proportion based on the different categories and the difficult levels, referring to step 14 for details. Before returning the test page, process-choice-component 422 will give a warning message saying that timing will start once you click the "start" button. As the player clicks the "start" button, the test page is displayed in the browser, and timing starts. The start time is recorded in the "start time" column of the player data table. The player must complete the test under given conditions, say, within a given time, and then click the "submit answers" button. In response to the clicking action being performed, enter-campaign-component 423 will submit the answers to the server system, and the system will capture the time when the clicking action occurs and record the time in the "submitting time" column of the player data table. Next, process-campaign-component 424 of the server side will mark the player's answers according to the marking criteria after receiving the player's answers and then store the score in the "score" column of the player data table. Each of the questions and puzzles has a question code, and every test page for the contest is also given a test page code when it is created, referring to FIG. 18. All the data on the test page including the test page code, the question codes, the ordinal number and the player's answers etc. are stored in the corresponding columns of the contest data table of the database. So, the player can get his previous test page using the test page code to review it in future. Once the given test time, say, fifteen minutes, is over, the system disables the "submit" button. If the player has not submitted the answers yet within the given time, component 423 isn't able to submit for the player, and component 424 will automatically give value 0 (zero) in the "score" column of the player table. When the contest is close to the end time, the system gives a countdown alert to warn the player. Besides the ID of the player is stored in the "player ID" column of the passcode data table as stated above, the passcode used by the player is stored in the "used passcode" column of the player data table. Hence no player can enter the contest by inputting the used passcode again. Component 424 also will send confirmative message 425 including the test page code to the player. One skilled in the art would appreciate that the passcode can be used more times, if so, simply, just make the passcode invalid after the specified times.

Figure 19:
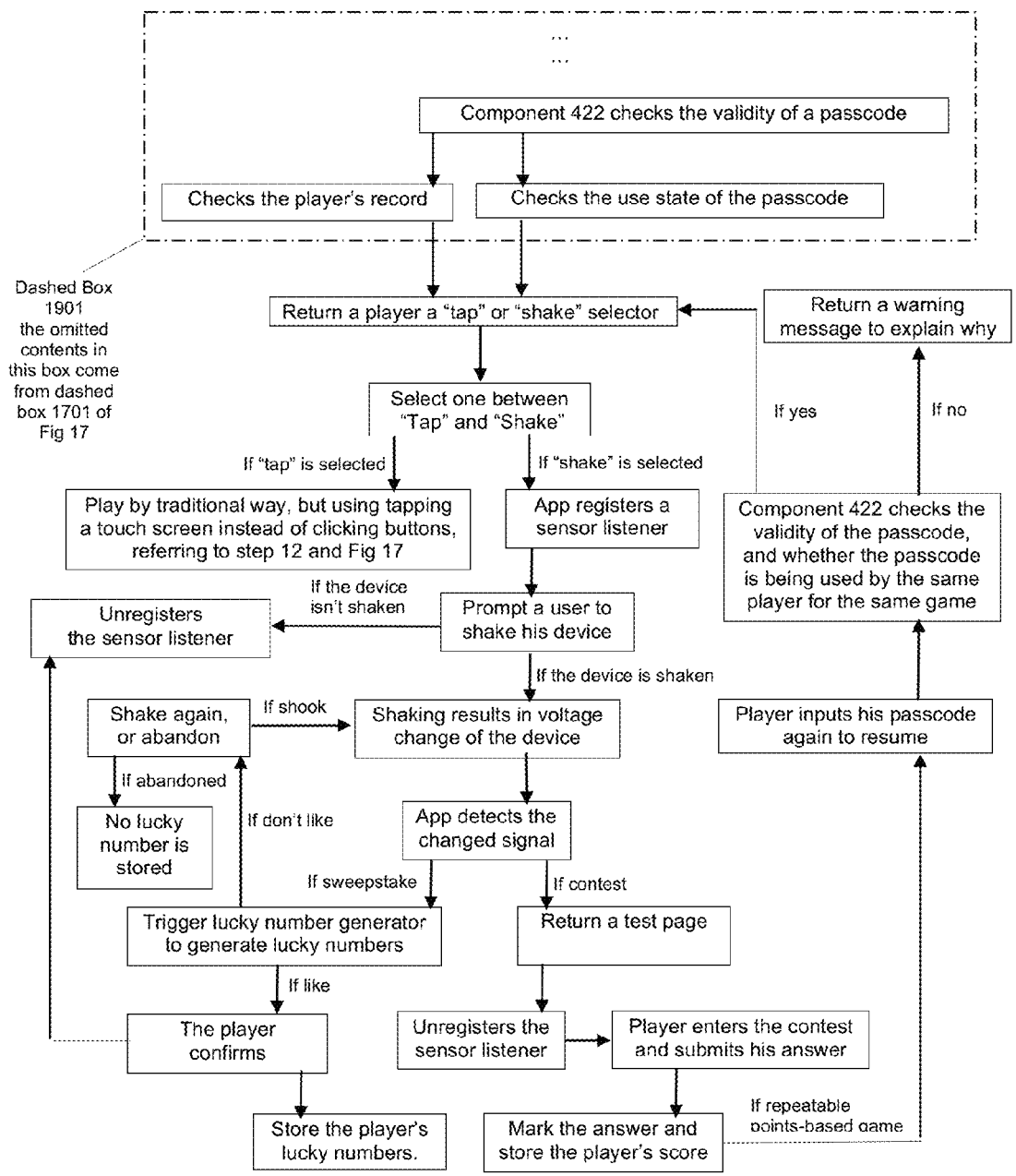
FIG. 19 is a flow diagram illustrating the process flow of how to play a game using a kind of mobile device and how to play by shaking the mobile device, referring to drawing 14/22.

The preceding paragraphs detail how to enter the campaign and to use the passcode. FIG. 17 shows the process flow of entering a campaign under different conditions, in which the steps included in Dashed Box 1701 also apply to the omitted contents of Dashed Box 1901 of FIG. 19.

13. How to Play by Shaking a Mobile Device Like a Smartphone?

The ways of entering a campaign described above are traditional ways. A new playing way is developed with development of the various mobile devices such as a smartphone and a tablet. Almost all the mobile devices are equipped with various sensors like an orientation sensor, an accelerometer sensor and a gyroscope sensor etc. Some of the sensors are able to sense the motion of the mobile device and thus generate the corresponding voltage signal. For example, when the smartphone is shaken, the sensor can sense the shake and generate the corresponding voltage, and the voltage signal can be transmitted. The new playing way is just based on the feature of the mobile device. Obviously, if a controller with these sensors is connected to a traditional computer, shaking the controller can cause the same effect. To play the game by shaking, the player must download an app from the present system and install it in his mobile device before starting. The app can listen to the change of the voltage and thus do the designed response. The following is the business processes of playing by shaking the mobile device, referring to FIG. 19.

To play by shaking, the beginning steps are similar to the traditional playing way, such as entering a passcode if necessary, choosing one group from the various mutual aid groups and choosing a sponsor in the chosen group, and checking the type of the group. These can refer to the business processes being illustrated in dashed box 1701 of FIG. 17. Because the steps are all the same, these contents are omitted, and replaced by blank dashed box 1901 in FIG. 19. The coming steps are different from the traditional way, referring to FIG. 19. Supposing a qualified player has a valid passcode and has chosen a sponsor, the app will give a "tap or shake" selector for the player to select one. The app provides the two options only when the mobile device is equipped with the sensors and a touch screen. The "tap" means to enter the campaign by tapping the touch screen. If the player selects the "tap", the app will provide the player with the pages, such as WAP pages. In fact, the tapping is equivalent to clicking on the traditional computer, and so, the "tap" is the traditional way really. The "shake" means to play by shaking the user's device. If the player selects the "shake", the app will register a sensor listener, that is to say, trigger a sensor listener. The shaking will result in the change of certain voltages, and the listener can listen to the change. The app will give the player a prompt of "shake your device" after registering. If the player doesn't shake his/her device in the given time, the app will unregister the listener. If the player shakes his/her device, and the listener can listen to the change of the voltage, and thus the app will make a suitable response for the sweepstake or the contest separately. The app can distinguish between the contest and the sweepstake. If the group is of the sweepstake-type, the voltage change will trigger a lucky numbers generator to generate automatically lucky numbers according to the rule of drawing winning numbers and show the lucky numbers for the player to confirm. If the player doesn't like the lucky numbers, he may shake again to generate a set of new numbers until the player is pleased, or abandon. In short, when a player shakes the device, a set of lucky numbers are automatically generated, and the player needn't manually pick and input any number. Once the player confirms, the app will unregister the listener and transmit the lucky numbers to the server system, and the server system will store the lucky numbers and related information in corresponding columns of the player data table. If abandoned, no lucky numbers are stored. If the campaign is of the contest type, the app will return a test page, and then unregister the listener. Immediately unregistering can prevent a wrong signal from generating due to the unintentional shaking. Next, the player can enter the contest and then submit his answer. The present system will mark, and store the score for the player.

The way of playing by shaking will give the players fresh experience. In addition, by the Global Positioning System (GPS) built in the mobile device, the present system can detect the player's location. Component 422 will record the player's location and check whether it is in the campaign-prohibited area. Supposing the player is just in the campaign-prohibited area, the player's shake will become ineffective.

Some games being developed based on the sensors are particularly suitable for the mobile device. More of the games are the points-based games. In such contests, the player's passcode can repeatedly be used, but only by the same player (the identical user ID, or the same IP address) for playing the same game. The player can get the certain number of points every time he wins. The system will record the number of points and the spent time each time. The player can stop playing and then resume at any time during the period of the campaign, referring to FIG. 19. The system will accumulate the number of points and the spent time until the campaign ends. Under this circumstance, component 422 will check the validity of the passcode and whether it is being used by the identical player ID for the same game. If yes, the system will continue the usual routines, or give a warning message to explain why. The repeatability can increase adhesion of the user to the present system, and this is helpful in attracting the users.

14. How to Randomly Retrieve Test Questions from the Test Question Bank to Form a Test Page?

Figure 20:
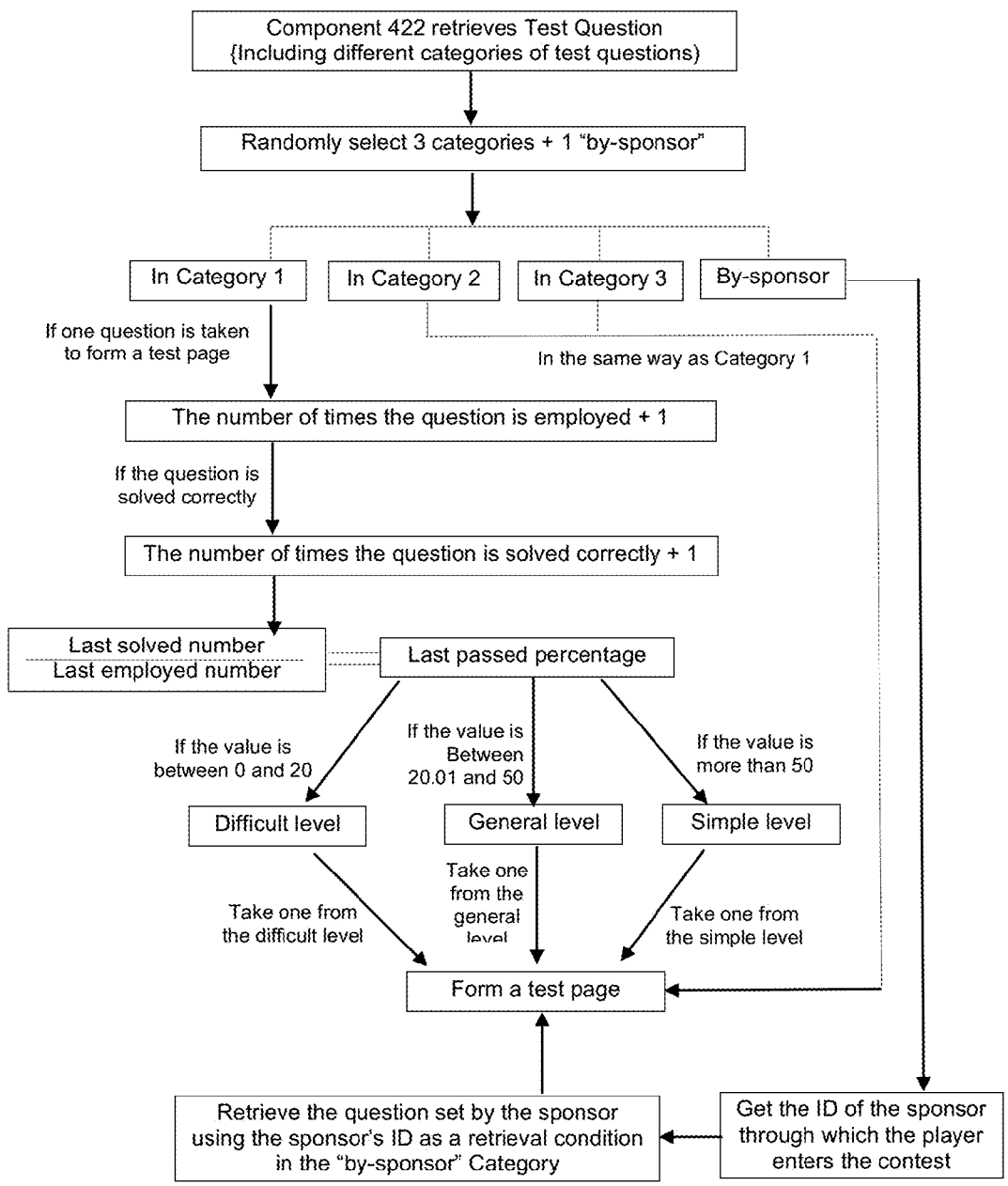
FIG. 20 is a flow diagram illustrating the process flow of how to retrieve test questions or puzzles randomly from the test question bank, referring to drawing 15/22.

In the previous step, it is mentioned that process-choice-component 422 will retrieve the questions from the question bank in proportion based on the categories of question and the levels of the difficulty. The following description will explain how to retrieve in proportion the test questions, referring to FIG. 20. There are many categories of question in the bank, such as: a math operation, a knowledge question, a Crossword, a Sudoku, an image analysis, a game, and the special "by-sponsor" category, etc. The "by-sponsor" category means that the question of this category is made up by a sponsor and is related to the sponsor's business, for example, Starbucks may make up a question: "What does Starbucks sell besides coffee?" and gives 4 answer options: a beer, a cola, a steak, and a snack. This has been discussed in step 6.

There are two values to be used to determine the difficulty of a question. A value is "the number of times the question is employed", and another one is "the number of times the question is solved correctly". The two values are separately stored in corresponding columns of the question bank table. The "the number of times the question is employed" is the number of times the question is employed to form a test page. Every time a question is employed, the FIG. 1 is added to the preexisting value of the "the number of times the question is employed" column in the question bank. This shows the value of the "the number of times the question is employed" column is a variable. The meaning of "the number of times the question is solved correctly" is very clear. It is variable too. Every time a player correctly answers a test question, process-campaign-component 424 will add FIG. 1 to the existing value of the "the number of times the question is solved correctly" column for this test question. The last value of the "the number of times the question is solved correctly" column divided by the last value of the "the number of times the question is employed" column is a last "passed percentage" (correcting to two decimal places usually). Supposing the difficulty of the test question has three different levels: "difficult", "general", "simple", and the rules set that the question that 0 to 20 percent of the players can correctly solve is difficult; the test question that 20.01 to 50 percent of the players can correctly answer is general; the test question that over 50 percent of the players can correctly solve is simple, the present system can determine the level of the difficulty of a test question based on the value of the "passed percentage" and store the difficulty value in the "difficulty" column of the question bank table. If a test question hasn't employed yet, the value of the "the number of times the question is employed" column must be blank, and the above division can't be done. In this case, the system assign a value 50% to the "passed percentage" column automatically, that is to say, the initial value of this column should be set to 50 percent.

Supposing a test page contains a total of ten test questions, and nine of the ten test questions separately belong to three different categories excluding the "by-sponsor" category, and the system need draw three questions separately from each of the three categories, and each of the three questions is at the different level of difficulty, process-choice-component 422 should first select randomly three categories from all the categories, then separately draw one difficult test question, one general question and one simple question based on the value of the "difficulty" column from each of the selected three categories. In case there is no test question at the certain level of difficulty, component 422 will take one again from the general level of questions as a replacement of the unavailable question, and usually there are test questions at this level because the initial value of difficulty level of any test question is just the general level, but if there is still no question at the general level, component 422 will draw one test question again from any of the other two levels as a replacement. It is important that an administrator should monitor the test question bank, and adjust and supplement it in time. Specially speaking, when a player enters a contest through some sponsor, process-choice-component 422 will specially retrieve the question made up by this sponsor based on this sponsor's ID in the "by-sponsor" category, and put the question into the test page, referring to step 6. That is to say, the question set by a sponsor can be retrieved and shown on the test page only when a player enters a contest through this sponsor rather than other sponsors.

15. How to Enter a Campaign from a Sponsor's Website?

Maybe a sponsor having been a member of a mutual aid group wants to get access to the sweepstake or the contest of its group from its own website, the present system prepared an app for the sponsor to download. The app can be set up and shown on the sponsor's site in some form like a frame, an image or others. The app has a built-in hyperlink that can bring a user to the present system from the sponsor's site via the communication network. The app should contain the information about this sponsor and its group, particularly an authentication code that is used for identifying the authenticated site. Besides, the app has a user ID field, a password field and one button. The button plays two different roles at different stages of the mutual aid group. The button has a title of "join" when the mutual aid group is at the grouping stage, while the title of the button is "play" when the mutual aid group is at the campaigning stage. The title is changed when the mutual aid group is transformed from the grouping stage to the campaigning stage. When a user clicks the button to send a request, the user's login information and the authentication code can be sent to the present system with the request. Process-registration-component 402 of the server system will check the authentication code, the user ID and his password. If everything is valid component 402 will make two different responses to the clicking action based on the different stage of the mutual aid group. At the grouping stage component 402 will trigger process-joining-component 406 of the server system, and the triggered component 406 will take the user to the application page for joining this group, referring to step 6. At the campaigning stage component 402 triggers process-choice-component 422 to take the user to the campaign page, referring to step 12, and then continue the routine. If a user hasn't a user ID and password yet, the user has to register first. The app will transfer the user to the registration page, referring to step 2. If the app hasn't a valid authentication code, a user can't reach the present system.

A 2D-barcode can perform the same tasks as the app. Like the app, the 2D-barcode should also contain related information and an authentication code, and have different tasks at different stages of the mutual aid group. When a user scans the 2Dbarcode, the 2Dbarcode will brings the user to different pages depending on the stage at which the group is. At the grouping stage it will take the user (sponsor) to the application page, while at campaigning stage it will take the user (player) to the campaign page.

For achieving the above purpose the sponsor may check the checkbox of "install app and 2D-barcode" on the application form for joining or initiating, or go to his/her account page and click on the app column and the 2D-barcode column, and the present system will open a download window for the sponsor to download, then the sponsor can transplant the app into its own site and/or put 2D-barcode on their own website, or print on their advertisement and posters etc. Thus a user, whether a sponsor or a player, can enter to the present system for joining a mutual aid group or entering a campaign through the app or the 2D-barcode from the sponsor's website.

16. How to Close a Promotional Campaign?

The duration of a promotional campaign of a mutual aid group is predetermined at the birth. The value of the attribute can be one month, three months or a year. The start time and the end time of the campaign are set by change-stage-component 416 when the mutual aid group is transformed to the campaigning stage from the grouping stage. As mentioned in step 9 above, the two time values are stored in the "start time" column and the "end time" column of the MAG pool data table. Close-campaign-component 426 has been monitoring the system time since the end time is set. Once the system time comes to the end time of the campaign, that is to say, the system time is equal to the set value of the "end time" column of this group, close-campaign-component 426 will be triggered to close the campaign on time by changing the value of the "stage" column of the MAG pool data table from "campaigning" to "closed" for this group. After this, the mutual aid group can only be retrieved as a closed group rather than a grouping or a campaigning group. Thus, the mutual aid group is transformed to the closed stage from the campaigning stage. The mutual aid group is closed is called a closed mutual aid group.

Another task of component 426 is to draw a set of winning numbers on the basis of the preset rule of drawing winning numbers if the group is of the sweepstake-type. Supposing the rule of drawing winning numbers is to pick 5 unrepeatable integers from 1 to 50, and when the value of the "stage" column is changed to the "closed", component 426 will immediately draw five integers from 1 to 50 according to a preset algorithm, and all the drawn numbers can't repeat each other. Certainly, the winning numbers can also be drawn under legal supervision manually or mechanically. What way should be used depends on the rules of the campaign. Close-campaign-component 426 will put the set of winning numbers in the "winning numbers" column of the MAG pool data table, and then send emails to every player to notify them of the winning numbers and let them know whether to win the promotional prize. At the closed stage the mutual aid group can no longer accept any sponsor or player, but it can respond to users' queries on winners or the history of the mutual aid group, etc.

17. How to Contribute a Test Question or a Puzzle?

The system and method of the present invention encourages the public to contribute a test question or a puzzle to the test question bank. The test question or the puzzle contributed by the public (contributor) is called a contribution herein. Allowing the public to contribute is to excite the public's interest and to open up an enormous source of the test question. This must enormously enrich the contents of the test question bank of the system. If someone makes a test question and wants to contribute it to the test question bank, the contributor just clicks on the "contribute" button of a page. Contribute-puzzle-component 427 of the client system will respond to the contributor's clicking action by sending a request to the server system, and process-contributingcomponent 428 of the server system will return a contribution form to the contributor after receiving the request, referring to FIG. 21. The category of the test question is various, and the ingredient of each category of test question is different. For example, for a multiple-choice question its ingredients should include a question, multiple options of probable answers to the question and a correct answer. The contribution form has some fields that are corresponding to the ingredients, and the fields are used for the contributor to put the every ingredient of the contribution. In addition, an explanation field is specially used for explaining the contribution. The contributor should also fill out other fields on the form with required info on the contributor.

If the contribution form is correctly completed without leaving any blank field on the form, component 427 will submit the contribution form to the server system if the contributor clicks the submit button, and process-contributing-component 428 separately store every ingredient of the contribution into the corresponding columns of the contribution data table of the database. Component 428 will assign an ID to the contribution, and store the ID and the submitting time in the "contribution ID" and the "contributing time" columns of the contribution data table.

The contribution data table has a "contributing state" column. This column is used for placing the values of the contributing state. About this state there are four probable values: "examining", "consulting", "upgraded" and "removed". The value "examining" means that the contribution has been submitted and is waiting for examining or is being examined. The value "consulting" means the contribution is posted to consult the public opinions. The "upgraded" means the contribution is good and has been transferred to the test question bank. The value "removed" means the contribution is poor and has been removed from the consulting list of contributions. When a contribution is stored into the contribution data table, the "examining" is automatically put in the "contributing state" column. This value "examining" will result in a warning sign that appears on the administrative interface to ask an examiner to examine the contribution to eliminate illegal contents like eroticism or violence. How to examine, upgrade and remove the contribution, please go on in step 18 below.

18. How to Comment and Rate a Contribution? how to Upgrade a Good Contribution?

A user can try, comment and rate the contributed test questions or puzzles being in the consulting state. If the user wants to do so, he/she just clicks on the "contributions" button. On the client side comment-contribution-component 429 will send a request to the server system in response to the clicking action being performed, while in response to the request process-comment-component 430 of the server system will retrieve all the contributions being in the consulting state from the contribution table and return a consulting page. Every contribution being in the consulting state is listed on the page for the user to try to solve, comment, and rate them. The system puts a "comment and rate" button beneath each contribution, referring to FIG. 22. If the user wants to view existing comments or to post his/her comment, just clicks on the "comment and rate" button. Component 430 will retrieve all the comments about this contribution using the contribution ID as the query condition from the comment data table, and then return a comment page to the user. The existing comments and ratings will be disclosed on the comment page. There are a text box for inputting a new comment and a rating selector below the existing comments. The rating selector can be presented in the various forms. This embodiment uses the rating scale from 1 to 5, so the selector can consist of 5 stars, and more numbers of highlighted star mean a higher rating. If a user likes to comment and vote to rate the contribution, the user should put his/her comment into the text box and vote by choosing the number of star, then clicks on the "submit" button. Process-comment-component 430 will store the comment and the rating with the contribution ID in the "comment" column and the "rating" column of the comment data table. To prevent frauds and abuses the system restricts the number of the single user's vote to only once, that is to say, a user ID or an IP address can comment and vote on the same contribution only once. There are Contribution ID, User ID and IP address columns in the comment data table. When storing a comment and a rating component 430 will query the comment record on the contribution using the contribution ID and user's ID or IP address as query conditions. If component 430 finds the comment of the user on this contribution has existed, component 430 will not record the second comment and rating of the user, particularly the rating. If the user is interested in the correct answer, just clicks the "get answer" button on the comment page.

Figure 23:
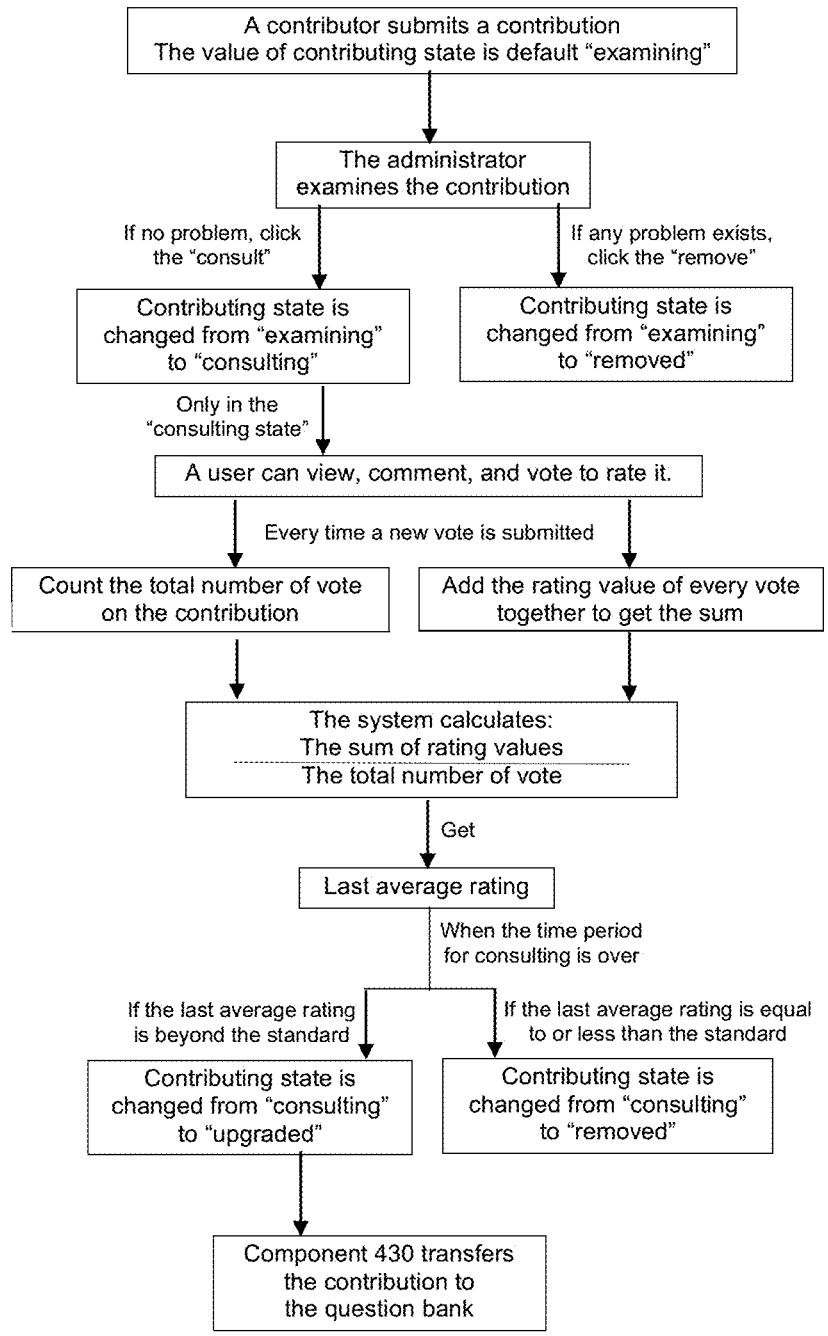
FIG. 23 is a flow diagram illustrating the process flow of how a high-rating contribution is upgraded and transferred to the test question bank, referring to drawing 17/22.

Besides storing the two values in the "comment" column and the "rating" column of the comment data table, every time a new comment and a vote are submitted, process-comment-component 430 will calculate an average rating the contribution has got. First, retrieve all the comments and votes using the contribution ID as a condition; Second, count the total number of vote on the contribution; Third, add the rating value of every vote together to get the sum; Forth, divide the sum by the total number of vote to get the average rating of the contribution. The average rating will be stored in the cell of the "average rating" column intersecting the row receiving the last vote in the comment table. Obviously, the average rating is a variable, that is to say, the last average rating in the row receiving the last vote is likely different from the previous average ratings. To draw a distinction between the good and poor contributions the system should set a standard of the average rating, say, the level 3, then the contribution whose last average rating is over 3 is classified as the high rating contribution and accordingly is deemed good, while the contribution whose last average rating is equal to or less than 3 is classified as the low rating contribution and thus is deemed poor, referring to FIG. 23.

If a warning sign appears on the administrative interface, this means there are some contributions waiting for examining. Clicking the sign can open a list, and all the contributions being in the examining state are retrieved from the contribution data table and listed on the administrative interface, and the same warning sign is also attached to every listing of the list. Clicking a listing can open the contributor's original contribution form, referring to FIG. 21. On the form only what is changed is both "submit" and "reset" buttons that have been replaced by a "consult" button and a "remove" button. The administrator must examine the contribution. If it contains illegal contents, the administrator should click the "remove" button, and in response to the clicking action component 430 will change the value of the "contributing state" column from the "examining" to the "removed". If the contribution has no illegal content and meets the rules, the administrator should click the "consult" button, and thus the contributing state will be changed from the "examining" to the "consulting". After any of the two buttons is clicked, the warning sign will disappear off the list of the contribution. When all the contributions waiting for examining have been processed, the main warning sign disappears. A consulting period of time is preset based on the terms and conditions, say, one month, or three months.

Process-comment-component 430 always monitors the system time for updating the contributing state at any time. Once the consulting end time comes, component 430 will query the value of the "average rating" column using this contribution ID as a query condition. If the value is equal to or less than the standard, component 430 will change the value of the contributing state from the "consulting" to the "removed", and this results in removing the contribution having the low rating from the consulting list. On the other hand, if component 430 detects the value of the "average rating" column is beyond the standard, it must change the value of the contributing state from the "consulting" to the "upgraded". Once the contributing state is updated to the "upgraded", process-comment-component 430 will transfer the contribution to the question bank by transmitting its values of every column of the contribution table to the corresponding columns of the question bank table. Naturally, the contributions that have been transferred or removed will no longer appear on the consulting list, because only the contributions being in the consulting state can be taken and put in the consulting list.

19. How to Post a Creative Project? how to Fund the Best of the Projects?

The present system and method encourages a creator and an inventor to post their creative project, invention, or idea so that the public and the professionals can comment and rate them. The present system and method will use a portion of the promotional prize to fund and reward the best of them. Like contributing a test question described in step 17 above, if the inventor or the creator wants to post a creative project, he/she just clicks on the "post-creation" button of a page. Post-creative-project-component 431 of the client side will send a request to the server system, and process-creative-project-component 432 of the server side will return a post-creative-project form, referring to FIG. 24, to the creator. The creator should fill out the form and then click the "post" button to post. Process-creative-project-component 432 will store the creator's name, the title of the creative project and the specification into a creation data table. Anyone being interested in the projects can view them by clicking the "creation" button of the navigation bar of a page, and comment and rate them. The detail for how to view, comment and vote to rate the creative project may refer to step 17 and step 18 above, and also refer to FIG. 25. This is similar to how to view, comment and vote to rate a contribution, so component 431 and component 432 aren't shown in FIG. 4 to save a space. Herein only discuss a bit of difference between them both.

Unlike the contributing, posting creative project has three states: a "posting" state, a "funded" state and a "removed" state, excluding "examining" state. The present system does not examine any project. The "posting" state means that the creative project has been posted. When a user clicks the "creations" button, process-creative-project-component 432 of the server system will retrieve all the projects being in the "posting" state to present to the user, and the user may choose one from the projects to view, comment and rate. The "funded" state means the project has been funded because of its won higher average rating, and the system should update the value of the state to "funded" from "posting". The "removed" state means the project has been removed because it has lower average rating, and the system should update the value of the state to "removed" from "posting".

20. How to Prevent a Staff from Defrauding of a Prize?

Besides the laws and the regulations the present system and method has a preventive mechanism to prevent any of the staff from defrauding of a prize. For a sweepstake the time when the present system draws winning numbers is set to be after the campaign closes, so nobody can get the winning numbers before the campaign closes. For a contest, if someone is able to master all the test questions and their correct answers, the one can easily win every contest to defraud of the prize, or divulge them to his/her friends to defraud of the prize. The preventive mechanism of the present system includes two restrictive measures: first, restrict the staff of access to the question bank only to authorized administrators; second, restrict an authorized administrator's access only to those test questions made up or examined by the administrator himself. According to the mechanism, the system requires that every time the system stores a question in the question bank it must also store the administrator's ID in the administrator's ID column of the question bank. So, when an administrator logs in the test question bank, the system only retrieves the test questions with the administrator's ID, but the administrator cannot access to any other test questions. Only a few senior administrators can access to the wider range of the questions bank. The mechanism can prevent the staff from stealing all the test questions and their answers.

21. How to Review a User's History? how to Amend a Subscription?

A sponsor or an initiator can want to amend its subscription or the initiation of a self-custom group; a contributor or a player can want to review their activity history in the present system. If so, they must first log in their accounts. Manage-account-component 433 will send the login request to the server system in response to the "login" action. The login is always necessary for every user including the sponsor, the initiator, the contributor, and the player whether to go to their accounts or to do any tasks described above just like using the majority of Internet services.

If a user's login is correct, process-account-component 434 of the server side will return an account page to the user, referring to FIG. 26. Besides the registration information on the user, the user's account balance, and shopping cart, the account page records the history of the user using the present system. No matter what the user is, the sponsor, the initiator, the player, or the contributor, as long as the user used the same user ID, every activity the user did using this ID is recorded here. The records entirely include the histories of the sponsor's subscriptions, the initiator initiating self-custom groups, the contributor's contributions and the player's activities. When a user logs in his/her account, process-account-component 434 will retrieve all the related records using the user ID as the query condition separately from each related data table of the database, and separately place them on the four corresponding lists of the account page. Generally, the sponsor's-subscription list records 7 items of data: Group ID, Current Stage, Your Share, Joining Time, Application No., Joining State, and Passcode. If a user clicks a group ID, the user can get the details of the mutual aid group with the group ID from the MAG pool data table of the database. If a user clicks an application No., the user can get and review his original application form. In the "passcode" column there possibly is one of two note words of "downloaded" or "download". The former means the user's passcodes has already been downloaded, and the latter means the passcodes haven't yet been downloaded. Clicking whichever of the two at any time will reopen the download page for the user to review or to download. The sponsor's-subscription list includes information about every mutual aid group the user had joined. The initiator-initiating-self-custom-groups list is the same as the sponsor's-subscription list, and only difference just is that their application numbers are a bit different in the format. The system uses "JO" as a prefix of the application number for joining, but prefixes "IN" to the application number for initiating. The initiator-initiating-self-custom-groups list lists all the self-custom mutual aid groups initiated by the user. The contributor's-contribution list records at least the four parameters: Contribution ID, Average Rating, Current State, and Contributing Time. Clicking the contribution ID, the user can get the details of the contribution from the contribution data table. The current state indicates the state in which the contribution is when a user reviews, such as examining, consulting, upgraded or removed state. The player's-activity list records the facts: Group ID, Group Type, Sponsor's ID, Used Passcode, Playing Time, Earned Score, Player's Lucky Numbers, Test Page Code, Result and Claim Time. The facts can be obtained from the related data tables of the database. As stated above, by clicking one of the facts, a player can get the related details. For example, clicking the test page code of a listing, the player can get the original test page for the player to review but adding a "get correct answer" button under those questions the player hasn't correctly answered. If the player wants the correct answer, by clicking the button he can get it from the question bank data table of the database. To have an intuitive grasp all the record listings are shown on the page, but one skilled in the art would appreciate using collapsible bars instead of them, and the collapsible bars can be expanded into the lists by clicking or dragging. This can make the appearance of the page simpler and cleaner.

Figure 27:
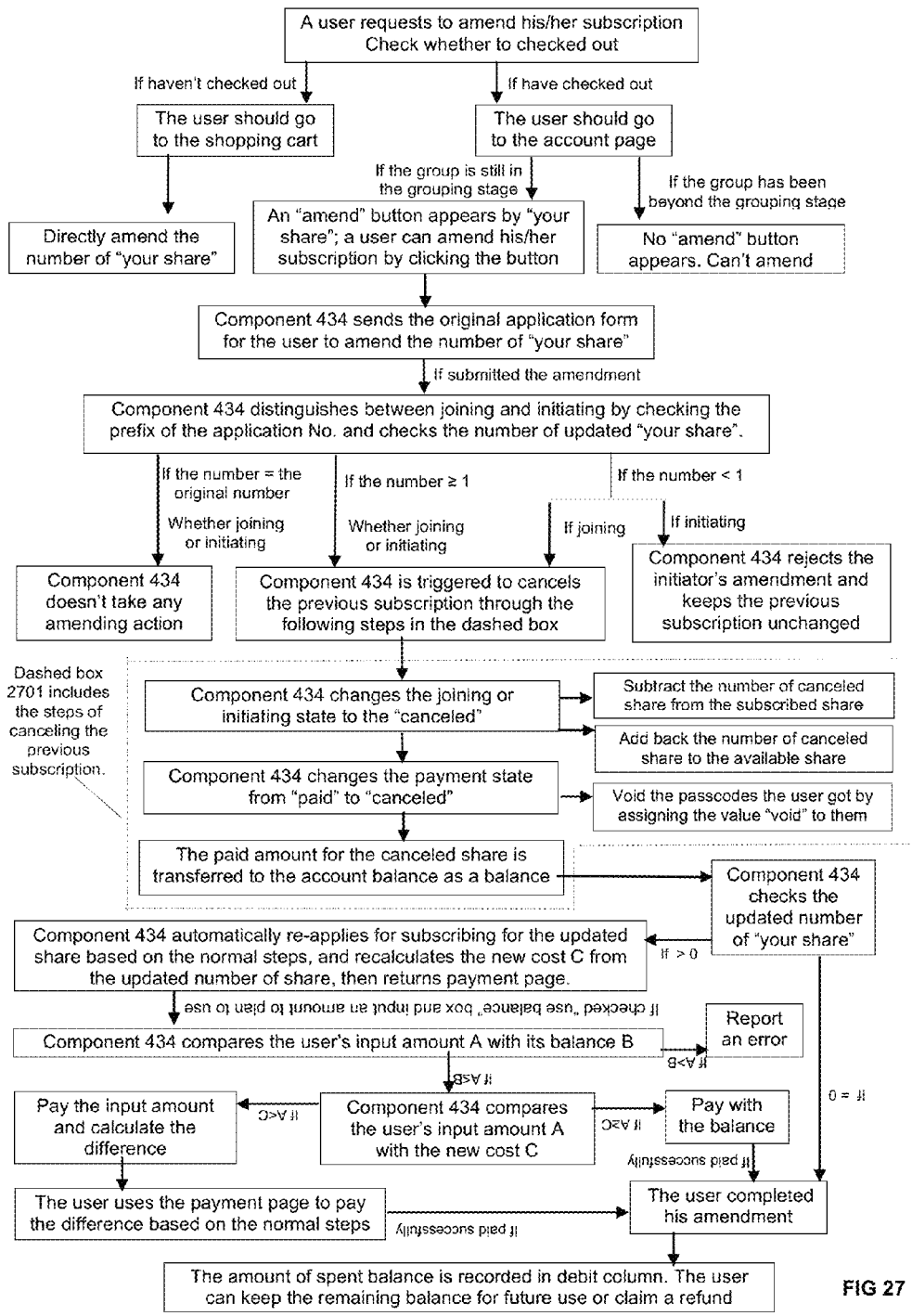
FIG. 27 is a flow diagram illustrating the process flow of how a user amends his previous subscription, referring to drawing 20/22.

Sometimes a sponsor or an initiator can want to amend his previous subscription. The system allows them to amend, but under different conditions the processes of the amendment vary, referring to FIG. 27. The key of the amendment should be the change of the number of subscribed share, i.e. the number of "your share", because it will directly affect the user's cost and expenses as well as the number of available share of the group, but the change of some other information, like the change of the business name and address, hasn't the effect. So, herein the discussion will focuses on amending the number of "your share".

For processing the user's request for amending process-account-component 434 need do the following several things: First, see whether the user has checked out. If the user hasn't checked out yet, the user may go to the shopping cart to directly amend the number of share, and the system does nothing for the amendment, because the number of "your share" in the shopping cart has not the effect on the number of available share of the group before the user checks out. The user can go to the shopping cart by clicking the "My Cart" button leading to the shopping cart on any page or on the account page. Second, if the user has checked out, the user has to log in his account page to amend, and see at what stage the group is. If the mutual aid group to which the user wants to amend his subscription lives still at the grouping stage, an "amend" button will appear by the value of the "your share". If the group has been beyond the grouping stage, the "amend" button will disappear, in other words, no amendment is allowed. Third, supposing at the grouping stage and that the user clicks the "amend" button, process-account-component 434 will return the user's original application form or a single "update your share" box omitting other information for the user to amend. The user should delete the previous number and input the updated number of share (that must be an integer), and then submit the amended form or the box. Fourth, because the system allows a sponsor who applies for joining a group to cancel his subscription completely, but does not allow an initiator to do so, that is to say, the sponsor's updated number is allowed to be zero, but the initiator must subscribe for at least one start-up share. So, after receiving the amendment, component 434 must check the number of updated share, and also distinguish between the sponsor and the initiator by checking the prefix of the application number. If the application number has the "IN" as the beginning, this indicates the user is an initiator. If the "JO" is used as the prefix of the application number, this indicates the user is a potential sponsor applying for joining. Component 434 will have the different response to the number of updated share based on the role of the applicant.

If the updated number is less than 1, component 434 will reject the initiator's request for the amendment and keep the initiator's original subscription unchanged, but it allows the sponsor to completely cancel his original subscription. If the updated number is equal to the number of user's original share, component 434 doesn't take any action whether the user is a sponsor or an initiator, because that is an unmeaning amendment. If the updated number is more than or equal to 1, whether the user is a sponsor or an initiator, component 434 will directly cancel the user's original subscription through a series of steps stated below, also illustrated in Dashed Box 2701 of FIG. 27.

Next, discuss how process-account-component 434 cancels an original subscription. Under the preceding conditions of canceling the original subscription, after received the user's request for the amendment, component 434 will automatically perform the task of canceling the original subscription by the following steps, but the user needn't take any action, referring to the dashed box 2701 of FIG. 27. Component 434 will firstly update the user's joining state or initiating state by changing the value of the "joining state" column or the "initiating state" column to the value "canceled" and record the update time in the "cancel time" column of the subscription data table. Once the value of the joining state or the initiating state is changed to the "canceled", the values of the "subscribed share" column and the "available share" column of the MAG pool data table must also follow it with their respective change, and the changes are just the reversals of the change caused by the original subscription, referring to step 9 above, that is to say, the number of canceled share will be subtracted from the "subscribed share" and added back to the "available share". On the other hand, the user's payment state must also be updated in the payment data table due to the change of the joining state and the initiating state. When the value of the "joining state" column or the "initiating state" column of the subscription data table becomes the "canceled", the value of the "payment state" column of the payment data table is changed from the "paid" to the "canceled", and when the value of the "payment state" becomes the "canceled", component 434 will transfer the amount the user has paid for the canceled subscription to the "balance" column of the account balance table for the user. The account balance data table is used for storing the user's balance information. Furthermore, if the user has got the passcode(s) for its previous subscription, component 434 must void the passcodes by putting the value "void" in the "Player ID" column of the passcode data table. As stated in step 12 the ID of the player must be stored in the "player ID" column of the passcode data table when the player uses a passcode, and process-choice-component 422 must query the value of the "player ID" column when judging the validity of the passcode. If there is a player's ID or the value "void" in the "player ID" column, the passcode is voided and unable to be used. In this way, the user's original subscription is canceled.

After the original subscription is canceled, the system will determine whether to reapply for the updated subscription for the user. This depends on whether the updated share is zero. The system should further check the updated number and take a corresponding action. If the updated number is zero, the user must be a sponsor applying for joining because the system doesn't allow an initiator to put "0" in the "your share" field when amending, and if the number is less than 1, the amendment has be stopped in the previous step. However, the system allows a sponsor to cancel his original subscription completely, it means to allow the sponsor to put the value 0 in the "your share" field. If component 434 detects the value 0 in the "your share" field of the amended form, it will not start the reapplying process, and thus the user's amendment completes.

If component 434 finds the value of the "your share" field is more than 0, this means the user is to update the number of share but not cancel completely. Thus, process-account-component 434 should automatically re-subscribe for the updated number of share for the user after cancelling the user's original subscription, and assign a new application number to the new subscription, and then store the related data in the subscription data table on the basis of the normal application procedure. Process-account-component 434 will recalculate the cost C (the updated cost is represented by letter C) from the updated number of share and trigger process-payment-component 412 to complete the payment process.

The payment procedure has been detailed in step 7 above, but there a feature is not mentioned. The following is a supplementary description. There is a checkbox named "use your balance" on the payment page. After being triggered, component 412 should check the user's account balance in the account balance data table. If the user has a balance B (herein the user's balance is represented by letter B) in its account, the amount of balance will appear by the checkbox of the payment page, but if the user has no balance, a value 0 just appears there (or the checkbox doesn't appear at all). If the user checks the checkbox, an input field for putting the amount of balance the user plans to use will appear nearby. The user should input the amount (the amount is represented by letter A) of balance he/she plans to use in the input field, and the system will compare the amount the user inputs with the account balance he owns. If the former is more than the latter (if A>B), the system should report an error, if the former is less than or equal to the latter (if A≤B), that is okay. As stated in step 7, the payment page can get the cost C of the updated share by inheriting the data from the reapplication and show the amount on the payment page. Component 412 will also compare the amount A the user inputs with the new payable cost C. If the input amount is equal to or more than the new payable cost (if A≥C), it means the user has enough balance for subscribing for the updated shares. The amount of spent balance will be recorded in the "debit" column of the account balance data table. By this time, the user completes the amendment.

If the input amount A is less than the new payable cost C (if A<C), in other words, the input amount A is insufficient to pay the new payable cost C, process-payment-component 412 will use the input amount A of balance to pay for the portion of the new payable cost C, and calculate the difference between the payable cost C and the user's input amount A, and place the difference on the payment form. The user must take action to pay the difference by completing the payment form following the normal procedures being stated in step 7. If the difference is successfully paid, the user's amendment is done. The amount of spent balance will be recorded in the "debit" column of the account balance table.

As mentioned above, the amount of spent balance is recorded in the "debit" column of the account balance data table, and the remaining balance (if any) is still kept in the "balance" column of the account balance table. There is a "refund" button by the amount of balance if a user has any balance. The user can find information about his balance on the account page, and he can keep his balance for future use or demand a refund by clicking the "refund" button. Demanding a refund is similar to claiming a prize, for the procedure of the refund, please refer to step 23 below.

22. How to Select a Winner? how to Query Winners?

A sweepstake-type of group differs from a contest-type of group in the way of selecting winners. Process-winner-component 436 is able to identify the type of the mutual aid group by checking the "type" attribute. A player of the sweepstake wants to win, and the lucky numbers the player picks must match the winning numbers completely or partially based on the preset rules. If the player's lucky numbers can satisfy the requirement, the player becomes a winner of the sweepstake and wins some category of prize. To select the winners of the sweepstake process-winner-component 436 should query all the players of this group using this group ID as the query condition in the player data table, then sort the "lucky numbers" column in order of the number of the lucky numbers matching the winning numbers from most to least. Those players ranked with the highest become the winners. Component 436 will store the categories of prize that each winner wins in each "result" column of the player data table.

Selecting the winners of the contest campaign is based on the player's weighting score. The weighting score is such a score got by weighting the test score and the spent time in the test. Similarly, component 436 need also query all the entrants of the contest using this group ID as the query condition in the player data table, and sort the "weighting score" column from the highest to the lowest score. Those entrants earning the highest score certainly become the winners. The category of prize each winner wins depends on his/her score. Component 436 will store the categories of prizes in the "result" column of the player table. Component 436 will notify every winner (whether the campaign is a sweepstake or a contest) and give a claim code for security reasons.

If a user wants to query the winners of a closed mutual aid group, the user must first ascertain the winners of which mutual aid group he/she wants to query. When a user clicks on the "winners" button of some page, in response to the clicking action being performed, query-winners-component 435 will send the user's request to the server side, and process-winners-component 436 of the server side will return a search page for the user to search for that closed mutual aid group the user wants, referring to FIG. 28. Some "search condition" fields are deployed on the search page. The fields separately correspond to a column of the MAG pool data table, such as Group ID, Prize, Type, and End Time etc. columns. The user has to enter one or more search conditions like a group ID in the related fields, and the user may also use a pull-down menu of each field to select one from the options. For example, the user may directly input a group ID in the group ID field, in case the user forgets, he/she may also select one from the pull-down menu, because the system has place all the closed mutual aid groups in the menu. However, with time the pull-down menu can get more and more long so that it become inconvenient for using. The user may also carry out a multi-condition search by inputting the expected values in several fields like the type field, the prize field, and the end time field, etc. The searching result contains a list of the closed mutual aid groups meeting the search conditions, and then the user can select the expected group from the list by clicking it. Once the selection is done, component 436 will create a winner webpage containing all the winners of the selected closed group and return the webpage to the user.

23. How to Claim a Prize?

If a winner wants to claim his won prize, the winner just clicks on the "claim" button of the navigation bar of a page. In response to the request, process-claim-component 438 of the server system will first require the winner to provide the claim code he/she has received. If the claim code is confirmed, component 438 will create a page containing a claim form and return the winner the form. The winner should fill in the form with the required information, referring to FIG. 29. The winner must also provide information about his/her tax and checking account, and submit the form by clicking on the "claim" button. In response to the clicking action, claim-prize-component 437 should submit the claim form to the server system, and process-claim-component 438 of the server side will query the value of the "result" column in the player data table using this user ID and this group ID as the query conditions. If the got value indicates this player is just a winner, component 438 will transfer the information about the claim to the financial institution for processing the claim. If the winner wants to remark on the campaign, he/she can put the remark in the "remark" box.

24. How to Find a Business?

With more and more businesses joining the various mutual aid groups, certainly, the present system will collect lots of information on the businesses. The present system provides a user with a Biz Finder to find a business. The biz finder may be deemed to be a byproduct of the present system. The biz finder includes many search boxes, for example, entity name, business classification, product and service, street address, city, state, phone number, web address, email address, etc. boxes. Some of the boxes have a pull-down menu. The system maps the boxes to the corresponding columns of the registration data table. The biz finder can help a user find a business as long as the user enters one or several search conditions in the boxes. In fact, the biz finder just provides the users with a business book. Unlike a general phone book, the biz finder can cover all the states, but the general phone book can only cover the local area.

The present system also provides the businesses having never joined a mutual aid group with an opportunity to enroll into the biz finder. There is an "enroll" button on the biz finder page. Clicking the button will lead to an enrollment form. The enrollment form includes some fields that correspond to the columns of the registration data table. Any business wants to enroll in the biz finder, it just inputs its information into the relative fields and submits, and the system will store the information into the database for the other users to search.

25. How to Perform Administrative Tasks?

The administrative tasks discussed herein only involve the tasks closely related to the present invention, and the general administration applying to all the Internet service like traffic statistics, the maintenance of security and safety etc. isn't discussed here. The administrative tasks are primarily include maintenance of the system, information queries and data statistics. The routine maintenance of the present system and method includes creating and releasing various mutual aid groups, making up test questions, examining and approving self-custom groups, examining and upgrading contributions. The query and the statistics include querying information, analyzing data, doing statistics, and the purpose of the query and analysis is to control the frequency of releasing the mutual aid groups and to adjust the type of the group, referring to FIG. 30.

On the administrative interface there are four buttons for maintenance of the system. Clicking the "create a group" button can open the creation form to create a mutual aid group, and it has been discussed in step 1 in detail. When a user initiated a self-custom mutual aid group, a warning sign should appear in a corner of the "initiated groups" button, the sign can even show the number of self-custom group of waiting for examining. Clicking the "initiated groups" button can open a list of the self-custom group waiting for examining, and it has also been discussed in step 3. The function of the "contributions" button is for an administrator to examine and upgrade a contribution, and it has been discussed in step 17 and 18. Clicking the "make-up-question" button can open the make-up-question form. Making up a question or designing a game is similar to contributing a test question or a puzzle, and it can refer to step 17 and FIG. 21. Difference between the two is there isn't the field of the explanation and the support materials on the make-up-question form. More importantly, the question or the puzzle made up by an administrator doesn't go through the processes of consulting, commenting, rating, and upgrading, but is directly stored in the test question bank.

The present system provides multiple tools for an administrator to query information on the operation of the system, and to make an analysis. For example, referring to FIG. 30, if the administrator wants to know the number of available shares of each grouping group, he/she may put the value "grouping" in the cell under the "stage" header in the attribute options table, and then click the headers of the "group ID", "type", "subscribed share" and "available share" options. The headers can go down, be checked, or be changed in color after being clicked. This indicates they have been selected as queried objects. When the administrator clicks the "query" button, the system will query the values of "group ID", "type", "subscribed share" and "available share" using the stage value of the "grouping" as the query condition, and then display the query result including all the mutual aid groups being at the grouping stage on the page. From the result the administrators can get operative data, such as the current number of grouping mutual aid groups and the current number of available share of each group. If the number of grouping groups being in operation is insufficient or the number of available share of the majority of the grouping groups is close to zero, the administrator should create more new mutual aid groups in time to replenish. The system should set a warning value. When the preceding numbers reach the warning value, a warning sign will appear in the corner of the "create a group" button to remind the administrator. If the administrator is interested in getting the time of completing grouping, just clicks the headers of the "time of release" and the "time of change from G to C" (from "grouping" to "campaigning") instead of clicking the headers of the "subscribed share" and the "available share" in the preceding example, he/she can get a related report or get a bar chart. Obviously, the less the time of completing grouping is, the more popular the mutual aid group is. The administrator can intuitively see what mutual aid group is popular from the bar chart, referring to FIG. 30, and he/she may create more such groups to satisfy the demand of businesses. If the administrator wants to get the composition of the members of one mutual aid group to analyze their classification and their annual sales, he/she may use the group ID as a query condition to query the "sponsor ID", the "business classification", and the "annual sales" by checking these headers. The administrator can get related reports or a pie chart, referring to FIG. 30, and thus know what business classification or the business having what annual sales prefers this type of mutual aid group. In addition, by analyzing the number of player the administrator can know which type of campaign is popular, and by doing the statistics on the test questions the administrators can know the number of each category of question at different difficulty levels and replenish the insufficient one. In short, the administrators can query and analyze lots of useful data and thus adjust the type of the campaign and the type of the mutual aid group, as well as the frequency of releasing the mutual aid group, and the duration of the campaign of each group to always keep the proper number of groups in the grouping stage and the proper number of groups in the campaigning stage to satisfy the players' and the businesses' need.

CONCLUSION, RAMIFICATIONS, AND SCOPE OF THE INVENTION

The present invention creates the system and method. By using the system and method an organizer can group a plurality of small businesses together by recruiting them in a mutual aid group to share a prize promotion. This enables the small business whose annual sales are only 100 thousand to run a large prize promotion of offering million prizes as a large business can do. In addition, the integration of both the mutual aid groups and the test question bank makes the businesses (even a big business) running the promotional contest easier, and greatly cut down the operative cost of the prize promotion.

The present embodiment of the system and method is designed based on the US laws and regulations. The laws and regulations are possibly unsuitable for other countries and areas. However, as an open tools and resources the present system and method can rent itself to the worldwide businesses. The present system can also release some mutual aid groups complying with the foreign laws to aim at the foreign businesses and players, and also the foreign business may rent the tools and resources of the present system to initiate a self-custom mutual aid group complying with the local laws. For example, the laws of some countries can set a ceiling on the highest amount of prize, and then the self-custom group initiated by the foreign business can't offer a higher prize than the ceiling. The laws of some areas can prohibit the sweepstake, and the foreign business may initiate a contest-type group instead of a sweepstake-type group. For the convenience of the foreign businesses the present system and method provides multiple versions in different languages. A foreign firm just selects its language and complies with the laws of its country, it can use the present system and method to initiate and run an expected promotional campaign.

The present system and method typically runs in the client-server architecture. Although the solution detailed in the specification is based on the browser-server architecture, one skilled in the art would appreciate that the present system and method can also run in other different environments. For example, the present system and method can run in an Electronic Mail or an Instant Messaging environment in which a message with a "join" button introduces a grouping mutual aid group to potential sponsors. Clicking on the "join" button in the message will put the joining into effect. Even if in the browser-server architecture, somebody can also design and use a specific client program to replace the universal browser programs. For instance, at present a lot of websites develops their own client apps to set up in the user's mobile devices, and the apps can interact with the developer's server system. So, the apps instead of the universal browser programs can also apply to the present system. In addition, besides the Internet, 3W, various communication channels may be used, such as a local area network, a wide area network, or a point-to-point dial up connection, whether wire or wireless. All in all, no matter what hardware is used, such as a conventional personal computer, a television-based systems or a popular mobile device like a smartphone and a tablet, and also no matter what software runs in the hardware, such as a universal browser or a fashionable app, as long as the server system and the client system can interact with and transmit data between each other, the function of the present system and method can be implemented.

At present the communication between the client system and the server system typically uses the Hyper Text Transfer Protocol (HTTP), but other transfer protocols, such as the Simple Mail Transfer Protocol (SMTP) and the Post Office Protocol (POP) can also be used. In short, in the different environments the transfer protocols can vary, but the implementation of the present system and method isn't restricted by the transfer protocol.

As stated above, an application program is usually divided into multiple components. The present system is also divided into the several components to implement its function separately. One skilled in the art would appreciate that these components may be combined or split, say, two components may combine to form one new component, or one component may be split into two new components. For example, component 410 and component 412 may combine to form one new component. In the present embodiment the present system is divided into some components roughly based on their function. Rebuilding of the components doesn't change the feature of the present system and method. In addition, the titles of the components of the present embodiment are only an epithet that doesn't precisely express the function of the component. One skilled in the art would appreciate that the titles may be replaced by other appellations. This specification has detailed the operation of the present system and method step by step above, but one skilled in the art would appreciate that the steps can also be combined, split, omitted, or rearranged in various ways.

The data tables of the database mentioned above aren't unchangeable, and they may be reformed, for example combining two or more tables together, splitting one table into two or more as long as the data tables can be used for storing related information. The data tables may also be named other captions. In the preferred embodiment of the present invention a sponsor joins a mutual aid group by clicking on "Join" button, and a player plays a sweepstake by clicking "play" button. One skilled in the art would appreciate that the buttons may be replaced by a text box, an image, even an infrared receiver, an optical receiver, a voice receiver, etc. as long as they can trigger a hyperlink to another webpage at the user's request. So, the clicking action may also be replaced by a touching action on the touch screen of the smart phone and tablet, even by a voice command.

Any modification to the present embodiment is apparent to those skilled in the art. All the general principles defined herein, however, apply to the modified embodiments without departing from the spirit and the scope of the invention. Thus, the present invention is not intended to be limited to the present embodiment shown, but to be accorded the widest scope consistent with the principles and the features disclosed herein.

The invention claimed is:

1. A computer-network-implemented system for sharing a prize promotion comprising:
   a) a grouping unit built by a set of program codes and defined by its attributes for accommodating a plurality of small businesses intending to join a collective promotion;
   b) a grouping unit storage area in the database of the system for storing said grouping unit;
   c) a grouping device built by a set of program codes for grouping at least one business together by recruiting the businesses into said grouping unit to form a group, including:
      a creating component for creating said grouping unit by assigning values to its attributes including the attribute on the shares which the prize offered by said grouping unit is divided into and saving the values of the attributes in said grouping unit storage area, and
      a choose-grouping-unit component for a small business to choose a preferable one from said grouping units being in the process of grouping the businesses together to join, and
      a subscribing component for the business to subscribe for the share of the chosen one of said grouping units, and
      a paying component for the business to pay the payable cost for its subscription, and
      a accepting component for the system to accept the qualified business that has subscribed for and paid for the share into the chosen one of said grouping units;
   d) a campaigning device built by a set of program codes for said grouping unit to run the collective prize promotional campaign for all the members of said grouping unit and thus to produce winners, including:
      a choose-campaign component for a player to choose one from the campaigns run by said grouping units being in the process of running the prize promotional campaign, and
      a choose-sponsor component for the player to choose one from the sponsors of said grouping unit running the chosen campaign to enter the prize promotional campaign through the chosen sponsor, and
      a run-campaign component for presenting a campaign page on the client side for the players to play, and
      a produce-winners component for producing winners on the basis of the results of the players getting in the promotional campaign after the system closes the promotional campaign;
   e) a controlling device built by a set of program codes for controlling the running process of said grouping unit including the process of grouping the businesses, the process of running the promotional campaign, and the transformation of these processes, including:
      a counting component for counting all the sold shares of one of said grouping units and/or all its remain shares still being available for businesses to subscribe for every time one business successfully subscribed for the share of that one of said grouping units, and
      a grouping-to-campaigning-transformation component for transforming the running process of said grouping unit to the process of running the collective promotional campaign from the process of grouping the businesses together to start the promotional campaign when the number of said sold shares of one grouping unit equals the total shares issued by this grouping unit or its remain share becomes zero, and
      a set-start-and-end-time component for setting the start time and the end time of the promotional campaign once the running process of said grouping unit is transformed from the process of grouping the businesses together to the process of running the promotional campaign, and
      a campaigning-to-closing-transformation component for transforming the running process of said grouping unit to the process of closing the promotional campaign from the process of running the promotional campaign to close the promotional campaign when said end time comes.

2. The system of claim 1, further comprising:
   a supplying-test-question device built by a set of program codes and a storage space that is associated with said run-campaign component of said campaigning device, including:
      a test question storage area in the database of the system for storing the test questions for testing the skills of the entrants to determine the winners in the promotional campaign run by said grouping unit, and
      a supply-test-question component for the administrator and/or the public to supply the test question to said test question storage area.

3. The system of claim 1, wherein said run-campaign component of said campaigning device includes:
   a contest component for retrieving said test questions from said test question storage area to form a contest page for the player to contest when the campaign is a contest, and
   a sweepstake component for the player to pick the lucky numbers and enabled to draw the winning numbers under the condition that the campaigning rules require when the campaign is a sweepstake.

4. A computer-network-implemented method for sharing a prize promotion comprising:
   a) creating a grouping unit capable of accommodating a plurality of small businesses using program codes by assigning values to its attributes including the attribute on the shares which the prize offered by said grouping unit is divided into;
   b) configuring a grouping unit storage area in the database of the system;
   c) storing said created grouping unit in said grouping unit storage area in the database by saving the values of its attributes;
   d) grouping at least one business together by recruiting the businesses into said grouping unit for jointly running the prize promotion, including the sub-steps of:
      choosing one from said grouping units being in the process of grouping the businesses together, whereby a small business may choose the preferable one to join, and
      subscribing for the share of the chosen one of said grouping units, whereby the business becomes eligible to join the chosen one of said grouping units, and
      paying the payable cost for the share which the business has subscribed for, and accepting the qualified business having completed the foregoing sub-steps into the chosen one of said grouping units;

e) running the promotional campaign through said grouping unit for all the members having joined this grouping unit to produce winners, including the sub-steps of:

choosing one from the campaigns run by said grouping units being in the process of running the promotional campaign, whereby a player has an opportunity to choose the preferred one to play, and choosing one from the sponsors of said grouping unit running the chosen campaign for the player to enter the chosen promotional campaign through the chosen sponsor, and running the campaign by presenting a campaign page on the client side for the players to play, and producing winners based on the players' results in the promotional campaign after the system closes the promotional campaign;

f) controlling the running process of said grouping unit including the process of grouping the businesses together, the process of running the collective promotional campaign, and the transformation of these processes, including the sub-steps of:

counting all the sold share of one of said grouping units and/or its remain share still being available for businesses to subscribe for every time one business successfully subscribed for the share of that one of said grouping units, and transforming the running process of said grouping unit from the process of grouping the businesses together to the process of running the collective promotional campaign to start the promotional campaign when the number of said sold shares of one grouping unit equals the total shares issued by this grouping unit or its remain share becomes zero, and setting the start time and the end time of the promotional campaign once the running process of said grouping unit is transformed to the process of running the promotional campaign from the process of grouping the businesses together, and transforming the running process of said grouping unit from the process of running the promotional campaign to the process of closing the promotional campaign to close the promotional campaign when said end time comes.

5. The method of claim 4, further comprising:

supplying the test questions used for testing the skills of the entrants of the promotional contest campaign run by said grouping unit, including the sub-steps of:

configuring a test question storage area in the database, and supplying the test questions for the contest campaign, whereby the administrator and/or the public can supply the test question, and storing the test questions in said test question storage area.

6. The method of claim 4, wherein said running the campaign includes:

running a sweepstake for the player to pick the lucky numbers and the system to draw the winning numbers under the condition that the campaigning rules require when the campaign is the sweepstake, and running a contest by retrieving the test questions from said test question storage area to form a contest page for the player to contest when the campaign is the contest.

\* \* \* \* \*